(12) United States Patent
Tatsuno

(10) Patent No.: US 10,175,568 B2
(45) Date of Patent: Jan. 8, 2019

(54) PROJECTIVE OPTICAL SYSTEM AND IMAGE PROJECTION DEVICE INCLUDING A SHIELDING UNIT

(71) Applicant: Hibiki Tatsuno, Kanagawa (JP)

(72) Inventor: Hibiki Tatsuno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 186 days.

(21) Appl. No.: 14/337,522

(22) Filed: Jul. 22, 2014

(65) Prior Publication Data
US 2015/0029474 A1    Jan. 29, 2015

(30) Foreign Application Priority Data

Jul. 26, 2013  (JP) .................................. 2013-156190

(51) Int. Cl.
*G03B 21/28* (2006.01)
*G02B 17/08* (2006.01)
*G03B 21/14* (2006.01)

(52) U.S. Cl.
CPC ............. *G03B 21/28* (2013.01); *G02B 17/08* (2013.01); *G03B 21/14* (2013.01); *G03B 21/142* (2013.01); *G03B 21/147* (2013.01)

(58) Field of Classification Search
CPC .... G02B 13/16; G02B 17/08; G02B 17/0852; G02B 17/0896; G03B 21/14; G03B 21/28; G03B 21/142; G03B 21/147
See application file for complete search history.

(56) References Cited

U.S. PATENT DOCUMENTS

| | | | | |
|---|---|---|---|---|
| 6,299,313 B1 * | 10/2001 | Hirata | ...................... | G02B 9/12 348/749 |
| 6,542,308 B2 * | 4/2003 | Hirata | ...................... | G02B 9/12 348/749 |
| 6,573,950 B1 * | 6/2003 | Hirata | .................... | G02B 13/16 348/744 |

(Continued)

FOREIGN PATENT DOCUMENTS

| | | |
|---|---|---|
| JP | 2008-522229 | 6/2008 |
| JP | 4396769 | 10/2009 |

(Continued)

*Primary Examiner* — Bao-Luan Le
(74) *Attorney, Agent, or Firm* — Oblon, McClelland, Maier & Neustadt, L.L.P.

(57) ABSTRACT

A projective optical system comprises: a lens optical system including lenses; and a transmissive optical element having an anamorphic surface and being provided in an optical path between the lens optical system and a projected surface, wherein the transmissive optical element has a curvature with respect to a direction corresponding to a long side of a display screen of the image display element, and on a cross-sectional surface being perpendicular to the long side of the display screen, and with respect to light being emitted from the lens optical system and being incident to the transmissive optical element, a light intensity of a first light flux being incident to the transmissive optical element at a first incident angle is lower than a light intensity of a second light flux being incident to the transmissive optical element at a second incident angle being larger than the first incident angle.

19 Claims, 8 Drawing Sheets

(56) References Cited

U.S. PATENT DOCUMENTS

| | | | | |
|---|---|---|---|---|
| 6,894,729 B2* | 5/2005 | Hirata | | G02B 13/16 348/744 |
| 7,048,388 B2* | 5/2006 | Takaura | | G02B 13/16 353/102 |
| 7,441,908 B2* | 10/2008 | Takaura | | G02B 13/16 353/102 |
| 7,529,032 B2* | 5/2009 | Takaura | | G02B 13/16 353/98 |
| 7,589,904 B2* | 9/2009 | Imafuku | | G02B 5/08 353/119 |
| 7,631,975 B2* | 12/2009 | Takaura | | G02B 13/16 353/102 |
| 7,637,618 B2* | 12/2009 | Takaura | | G02B 13/16 353/102 |
| 7,637,621 B2* | 12/2009 | Takaura | | G02B 13/16 353/102 |
| 7,911,704 B2* | 3/2011 | Takaura | | G02B 13/16 353/98 |
| 7,922,341 B2* | 4/2011 | Takaura | | G02B 13/16 353/102 |
| 7,938,545 B2* | 5/2011 | Takaura | | G02B 13/16 353/70 |
| 8,014,075 B2* | 9/2011 | Minefuji | | G02B 17/08 359/631 |
| 8,087,789 B2* | 1/2012 | Amano | | G03B 21/28 353/99 |
| 8,128,238 B2* | 3/2012 | Fujita | | G03B 21/10 353/119 |
| 8,189,264 B2* | 5/2012 | Abe | | G02B 17/0804 359/649 |
| 8,210,693 B2* | 7/2012 | Nishikawa | | G02B 17/08 353/122 |
| 8,434,878 B2* | 5/2013 | Morikuni | | G03B 21/28 353/119 |
| 8,482,851 B2* | 7/2013 | Nagatoshi | | G02B 17/08 353/98 |
| 8,511,837 B2* | 8/2013 | Takahashi | | G03B 21/14 348/782 |
| 8,794,772 B2* | 8/2014 | Morikuni | | G03B 21/28 353/119 |
| RE45,258 E* | 11/2014 | Takaura | | G02B 13/16 353/102 |
| 8,922,883 B2* | 12/2014 | Tatsuno | | G02B 17/08 359/364 |
| 8,950,874 B2* | 2/2015 | Tatsuno | | G02B 17/08 353/101 |
| 8,985,786 B2* | 3/2015 | Fujioka | | G03B 21/2066 353/119 |
| 9,039,196 B2* | 5/2015 | Hirakawa | | G03B 21/28 353/73 |
| 9,091,908 B2* | 7/2015 | Yamada | | G03B 21/145 315/291 |
| 2002/0034017 A1* | 3/2002 | Hirata | | G02B 9/12 359/649 |
| 2004/0141159 A1* | 7/2004 | Abe | | G02B 13/22 353/97 |
| 2004/0156117 A1* | 8/2004 | Takaura | | G02B 13/16 359/651 |
| 2004/0184160 A1 | 9/2004 | Nishina et al. | | |
| 2005/0185288 A1 | 8/2005 | Nishina et al. | | |
| 2005/0195492 A1 | 9/2005 | Nishina et al. | | |
| 2005/0195493 A1 | 9/2005 | Nishina et al. | | |
| 2006/0126032 A1* | 6/2006 | Takaura | | G02B 13/16 353/99 |
| 2007/0216877 A1 | 9/2007 | Sacre et al. | | |
| 2008/0079915 A1 | 4/2008 | Amano et al. | | |
| 2008/0192208 A1 | 8/2008 | Benoit et al. | | |
| 2008/0218707 A1* | 9/2008 | Adachi | | G03B 21/145 353/98 |
| 2008/0304019 A1* | 12/2008 | Takaura | | G02B 13/16 353/38 |
| 2009/0015801 A1* | 1/2009 | Takaura | | G02B 13/16 353/99 |
| 2009/0015910 A1* | 1/2009 | Takaura | | G02B 13/16 359/364 |
| 2009/0021703 A1* | 1/2009 | Takaura | | G02B 13/16 353/99 |
| 2009/0116124 A1* | 5/2009 | Minefuji | | G02B 17/08 359/727 |
| 2009/0141370 A1* | 6/2009 | Takaura | | G02B 13/16 359/734 |
| 2009/0153809 A1* | 6/2009 | Amano | | G03B 21/28 353/99 |
| 2009/0213470 A1* | 8/2009 | Abe | | G02B 17/0804 359/649 |
| 2010/0039625 A1* | 2/2010 | Takaura | | G02B 13/16 353/70 |
| 2010/0165308 A1* | 7/2010 | Morikuni | | G03B 21/28 353/98 |
| 2010/0171937 A1* | 7/2010 | Hirata | | G02B 13/16 353/70 |
| 2010/0245784 A1* | 9/2010 | Nishikawa | | G02B 17/08 353/99 |
| 2010/0309443 A1* | 12/2010 | Cheng | | G02B 26/0883 353/81 |
| 2011/0026111 A1* | 2/2011 | Nagatoshi | | G02B 17/08 359/364 |
| 2011/0038039 A1* | 2/2011 | Takaura | | G02B 13/16 359/364 |
| 2011/0069286 A1* | 3/2011 | Itoh | | H04N 9/3141 353/119 |
| 2012/0092628 A1* | 4/2012 | Takahashi | | G03B 21/14 353/82 |
| 2012/0154768 A1 | 6/2012 | Tatsuno | | |
| 2012/0162753 A1 | 6/2012 | Tatsuno | | |
| 2013/0070217 A1* | 3/2013 | Tatsuno | | G02B 17/08 353/99 |
| 2013/0100418 A1* | 4/2013 | Yoshikawa | | G03B 21/145 353/31 |
| 2013/0107166 A1* | 5/2013 | Osaka | | G02F 1/133308 349/61 |
| 2013/0107232 A1 | 5/2013 | Tatsuno | | |
| 2013/0107233 A1 | 5/2013 | Hirakawa et al. | | |
| 2013/0107234 A1 | 5/2013 | Nishina et al. | | |
| 2013/0114053 A1* | 5/2013 | Tatsuno | | G03B 21/28 353/99 |
| 2013/0215400 A1* | 8/2013 | Morikuni | | G03B 21/28 353/98 |
| 2013/0235356 A1 | 9/2013 | Takahashi et al. | | |
| 2014/0118818 A1 | 5/2014 | Nishina et al. | | |
| 2014/0126045 A1 | 5/2014 | Tatsuno et al. | | |

FOREIGN PATENT DOCUMENTS

| | | |
|---|---|---|
| JP | 4467609 | 3/2010 |
| JP | 2010-152264 | 7/2010 |
| JP | 2010-266838 | 11/2010 |
| JP | 2011-242606 | 12/2011 |
| JP | 2013-088727 | 5/2013 |

* cited by examiner

PROJECTIVE OPTICAL SYSTEM AND IMAGE PROJECTION DEVICE INCLUDING A SHIELDING UNIT

CROSS-REFERENCE TO RELATED APPLICATION(S)

The present application claims priority to and incorporates by reference the entire contents of Japanese Patent Application No. 2013-156190 filed in Japan on Jul. 26, 2013.

BACKGROUND OF THE INVENTION

1. Field of the Invention

The present invention relates to an image projection device, such as what is called a projector, and, more particularly, to a projective optical system for enlarging and projecting, on a projected surface of a screen, or the like, an image that is displayed on an image display element, and to an image projection device that includes the projective optical system.

2. Description of the Related Art

The principal part of an image projection device called a projector, or the like, typically has the configuration illustrated in FIG. 8.

FIG. 8 schematically illustrates an example of the typical configuration of an optical engine of the image projection device. With the configuration illustrated in FIG. 8, the display screen of an image display element 102 that is a digital micromirror device (DMD), a liquid crystal display panel, or the like, and that is referred to as a light valve is irradiated with light from a lamp 101 that is a light source, and the enlarged image of the image displayed on the image display element 102 is projected by a projective optical system 103 on a screen 104 that forms a projected surface.

More specifically, light from the lamp 101 is focused on an inlet of an integrator rod 106 by a reflector 105. The integrator rod 106 is a light pipe that is formed into a tunnel-like shape by combining four mirrors, and the incident light through the inlet is repeatedly reflected by a mirror surface inside the integrator rod 106, whereby the variations in the light intensity become even at the outlet of the integrator rod 106. The light from the outlet is treated as a surface light source where the variations in the light intensity have become even, the light source image from the surface light source is passed through an illumination optical system that includes a lens system 107, a mirror 108, a curved mirror 109, or the like, and, in this case, it is formed on the display screen of the image display element 102 that includes, for example, a DMD so as to be illumination light. The display screen of the image display element (DMD) 102 is irradiated with the illumination light of the even lighting intensity distribution; therefore, the screen image that is projected onto the screen 104 as the enlarged image of the displayed image also has the even lighting intensity distribution.

Here, the DMD that is used as the image display element 102 has a large number of micro mirrors, and the device is capable of electronically and individually controlling the angle of each of the micro mirrors in the range between +12° and −12°. Here, the angle at which illumination light enters the DMD is set such that, for example, when the angle of one micro mirror is −12°, the reflected light of the illumination light due to the micro mirror enters the projective optical system and, when +12°, the reflected light of the illumination light does not enter the projective optical system; thus, by controlling the tilt angle of each of the micro mirrors of the DMD, it is possible to form a digital image on the display screen of the DMD and project the image on the screen 104 via the projective optical system 103.

Furthermore, as for this type of image projection devices, there have been recently popular projectors in which the installation position of a screen that forms a projected surface is extremely close compared to the conventional ones. The principal purpose of such up-close projectors is to prevent projected light from entering the eyes of a presenter, such as a person who speaks or makes a presentation, who is located near the screen, or to prevent a situation where a projector is installed near a listener who receives the presenter's explanations, or the like, so that the listener is prevented from being adversely affected by the exhaust air, noise, or the like, of the projector.

The projective optical systems for image projection devices, such as up-close projectors, implement a method of reducing the projection distance by simply increasing the angle of view of the conventional (coaxial/rotationally symmetrical) projective optical systems or a method of reducing the distance between the image projection device and the screen by deflecting the projection optical path while correcting the distortion of an image by using a curved mirror. As for the former, i.e., the method of simply increasing the angle of view of the projective optical system, although the object of up-close projection can be achieved as the extension of technologies of the conventional projective optical systems, the outer diameter of a lens that is located close to the screen tends to be increased, and the size of the overall image projection device (projector) tends to be large. Conversely, as for the latter, i.e., the method of using the curved mirror, there is a possibility that up-close projection can be achieved regardless of a small size.

The conventional technology of image projection devices that use the above curved mirror is disclosed in, for example, Japanese Patent No. 4396769, Japanese Patent Application Laid-open No. 2011-242606, Japanese Patent No. 4467609, Japanese Translation of PCT International Application Publication No. 2008-522229, Japanese Patent Application Laid-open No. 2010-266838, Japanese Patent Application Laid-open No. 2010-152264, and Japanese Patent Application Laid-open No. 2013-88727.

In Japanese Patent No. 4396769, in consideration of the lighting intensity distribution of an image that is projected onto a screen, an emission lens is a spherical meniscus lens that is located between a refractive optical unit of a projective optical system and a screen and that also has a capability to prevent dust from entering the projective optical system, whereby the evenness of the lighting intensity distribution on the screen is improved. Specifically, in Japanese Patent No. 4396769, although consideration is given to a degradation of the lighting intensity distribution on the screen due to an adverse effect of the optical element alone for prevention of dust into the inside of the projective optical system, consideration is not given to the occurrence of unevenness of the light use efficiency within the refractive optical unit due to an improvement in the image quality of the projective optical system.

Furthermore, there are known up-close projective optical systems that has a combination of a lens optical system and a reflective optical system as disclosed in Japanese Patent Application Laid-open No. 2011-242606; however, if such a projective optical system is actually housed in a chassis and is configured as a typical projector, or the like, a member that has a capability to transmit light and prevent dust needs to be provided between a concave mirror of a reflective optical system and a screen.

Furthermore, in almost the same manner as the emission lens in the above-described Japanese Patent No. 4396769, an optical member that is located between a lens optical system of a projective optical system and a screen and that has a capability to prevent dust from entering the projective optical system is described in Japanese Patent No. 4467609, Japanese Translation of PCT International Application Publication No. 2008-522229, Japanese Patent Application Laid-open No. 2010-266838, Japanese Patent Application Laid-open No. 2010-152264, and Japanese Patent Application Laid-open No. 2013-88727. Although the emission lens in Japanese Patent No. 4396769 has a spherical meniscus shape, the optical member for dust prevention in Japanese Patent No. 4467609, Japanese Translation of PCT International Application Publication No. 2008-522229, and Japanese Patent Application Laid-open No. 2010-266838 is described as an optical member that includes a flat plate, i.e., a flat-surface plate-like member, and the lighting intensity distribution on the image displayed on the screen is hardly mentioned in Japanese Patent No. 4467609, Japanese Translation of PCT International Application Publication No. 2008-522229, and Japanese Patent Application Laid-open No. 2010-266838.

Furthermore, in Japanese Patent Application Laid-open No. 2010-152264, the above-described optical member for dust prevention is formed of a central portion and a peripheral portion that is adjacent to the central portion, and the peripheral portion is curved to the inlet side of projected light. In this case, both the central portion and the peripheral portion are principally formed as flat-surface plate-like members, and the surface at the central portion from which projected light is emitted is sometimes tilted toward the screen. Moreover, in Japanese Patent Application Laid-open No. 2013-88727, a cover that corresponds to the above-described optical member for dust prevention has a curved shape that makes small the incident angle and the emission angle of a principal light beam at the cover, and the curved shape of the cover includes various surface shapes, such as a spherical surface, aspheric surface, toric surface, toroid surface, or flexibly curved surface. Japanese Patent Application Laid-open No. 2010-152264 and Japanese Patent Application Laid-open No. 2013-88727 do not particularly mention the light intensity distribution on the basis of light flux in the principal lens optical system of the projective optical system.

For example, if one pixel light flux is transmitted through the central part of the optical path within the lens optical system, and the other pixel light flux is transmitted through the peripheral position of the optical path within the lens optical system, i.e., light fluxes are transmitted through different locations of the optical path within the lens optical system, there is a difference in the light use efficiency within the screen due to a difference among the pixel light fluxes in the angle at which they enter an optical element, such as a lens, or the distance over which they pass through an optical element. If they are accumulated due to a plurality of optical components, such as lenses or concave mirrors, variations in the lighting intensity at each location of an image are increased on the screen.

In view of the above-described problem, there is a need to prevent variations in the lighting intensity at each location of an image on a projected surface.

SUMMARY OF THE INVENTION

It is an object of the present invention to at least partially solve the problems in the conventional technology.

According to the present invention, there is provided a projective optical system that enlarges and projects, on a projected surface, an image that is displayed on an image display element, the projective optical system comprising: a lens optical system that includes a plurality of lenses; and a transmissive optical element that has an anamorphic surface and that is provided in an optical path between the lens optical system and the projected surface, wherein the transmissive optical element has a curvature with respect to a direction that corresponds to a long side of a display screen of the image display element, and on a cross-sectional surface that is perpendicular to the long side of the display screen of the image display element, and with respect to light that is emitted from the lens optical system and that is incident to the transmissive optical element, a light intensity of a first light flux that is incident to the transmissive optical element at a first incident angle is lower than a light intensity of a second light flux that is incident to the transmissive optical element at a second incident angle that is larger than the first incident angle.

The present invention also provides an image projection device comprising a projective optical system that enlarges and projects, on a projected surface, an image that is displayed on an image display element. In the image projection device, the projective optical system comprises: a lens optical system that includes a plurality of lenses; and a transmissive optical element that has an anamorphic surface and that is provided in an optical path between the lens optical system and the projected surface, and the transmissive optical element has a curvature with respect to a direction that corresponds to a longitudinal direction of a display screen of the image display element, and on a cross-sectional surface that is perpendicular to a long side of the display screen of the image display element, and with respect to light that is emitted from the lens optical system and that is incident to the transmissive optical element, a light intensity of a first light flux that is incident to the transmissive optical element at a first incident angle is lower than a light intensity of a second light flux that is incident to the transmissive optical element at a second incident angle that is larger than the first incident angle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
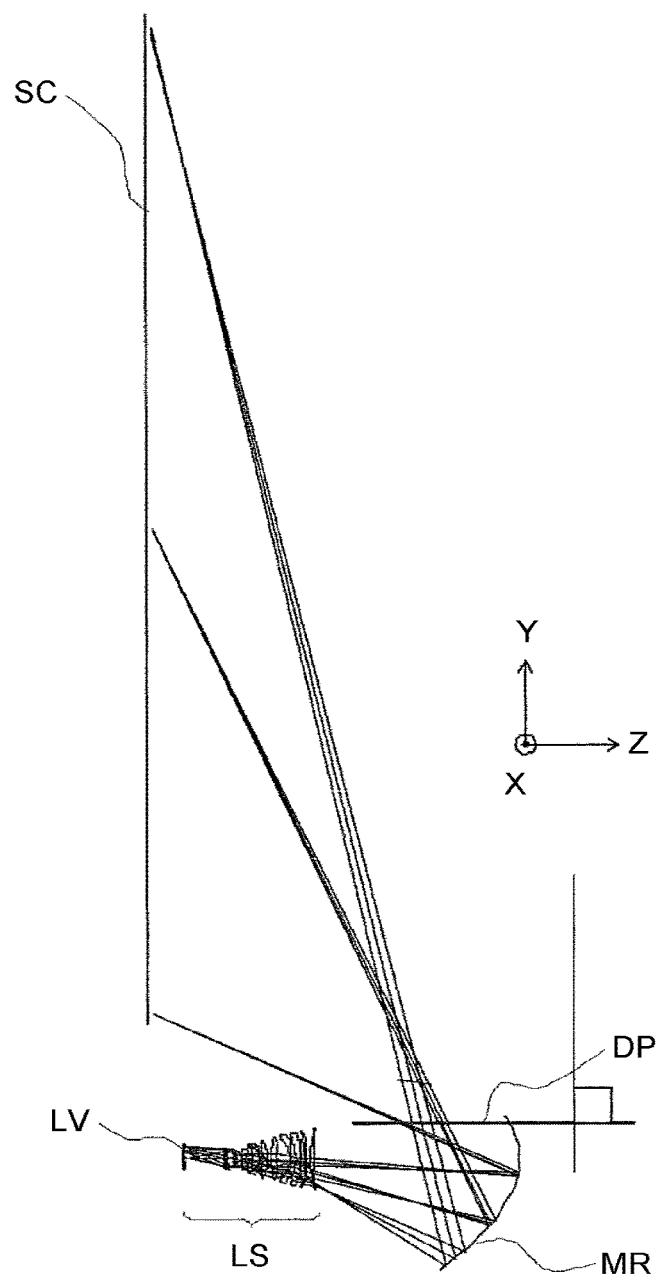
FIG. 1 is a cross-sectional view that illustrates the principal configuration of an overall projective optical system according to a first example that is a first embodiment of the present invention along the cross-sectional surface that includes an optical axis and that is perpendicular to the long side of a display screen of an image display element together with an optical path.

A detailed explanation is given below, with reference to the drawings, of a projective optical system according to the present invention on the basis of an embodiment of the present invention. Before a specific example is explained, the principle of the present invention is first explained.

In a projective optical system where an image displayed on an image display element is sequentially passed through a lens optical system and a reflective optical system that uses a concave mirror that has a flexibly curved surface and that forms a concave reflective surface and the image is enlarged and formed on a projected surface of a screen, or the like, if the light use efficiency of each pixel light flux is different, unevenness occurs in the lighting intensity distribution on the projected image. Therefore, as a concept, it is preferable that the difference in the light use efficiency among pixel light fluxes that occurs due to the lens optical system and the reflective optical system is offset by a dust preventing member that is an optical element that is provided between the reflective optical system and the projected surface in order to prevent dust from entering the projective optical system.

However, actually, if an optical element is configured as a dust preventing member to make the lighting intensity distribution completely even, there is a possibility that an optical element has, as the dust preventing member, an extremely complicated shape, such as a flexibly curved surface, or the important optical performance, such as resolution or distortion, is degraded.

Conversely, a consideration is given to a case where the dust preventing member is, for example, a flat-plate optical element that can be easily manufactured and it has a layout such that the flat plate surface is perpendicular to the projected surface of the screen, or the like. In this case, it is obvious that, with respect to the horizontal, i.e., the right and left direction of the screen, the pixel light flux that passes through the center of the lens optical system (specifically, the light flux that enters the lens optical system from the pixel that is located at the center of the display screen of the image display element with respect to the horizontal direction of the screen) is incident to the dust preventing member at an angle of 0 degree in the right and left direction; thus, the light use efficiency at the dust preventing member is high. However, as for the light fluxes that enter the lens optical system from the pixels on both ends of the display screen of the image display element with respect to the horizontal, i.e., the right and left direction of the screen, the incident angle relative to the dust preventing member is large, and thus the light use efficiency at the dust preventing member is low.

Furthermore, with respect to the vertical direction, i.e., the up and down direction, of the screen, a pixel light flux that passes through the center of the lens optical system (i.e., a light flux that enters the lens optical system from a pixel that is on the display screen of the image display element and that is located closest to the optical axis of the lens optical system in the vertical direction of the screen) moves toward the lowermost end of the projected surface of the screen, or the like; therefore, the incident angle relative to the dust preventing member is large, and the light use efficiency at the dust preventing member is low. Conversely, a light flux that enters the lens optical system from a pixel that is on the display screen of the image display element and that is located farthest from the optical axis of the lens optical system in the vertical direction, i.e., the up and down direction, of the screen, moves toward the uppermost end of the projected surface of the screen, or the like; therefore, the incident angle relative to the dust preventing member is small, and the light use efficiency at the dust preventing member is high.

Figure 2:
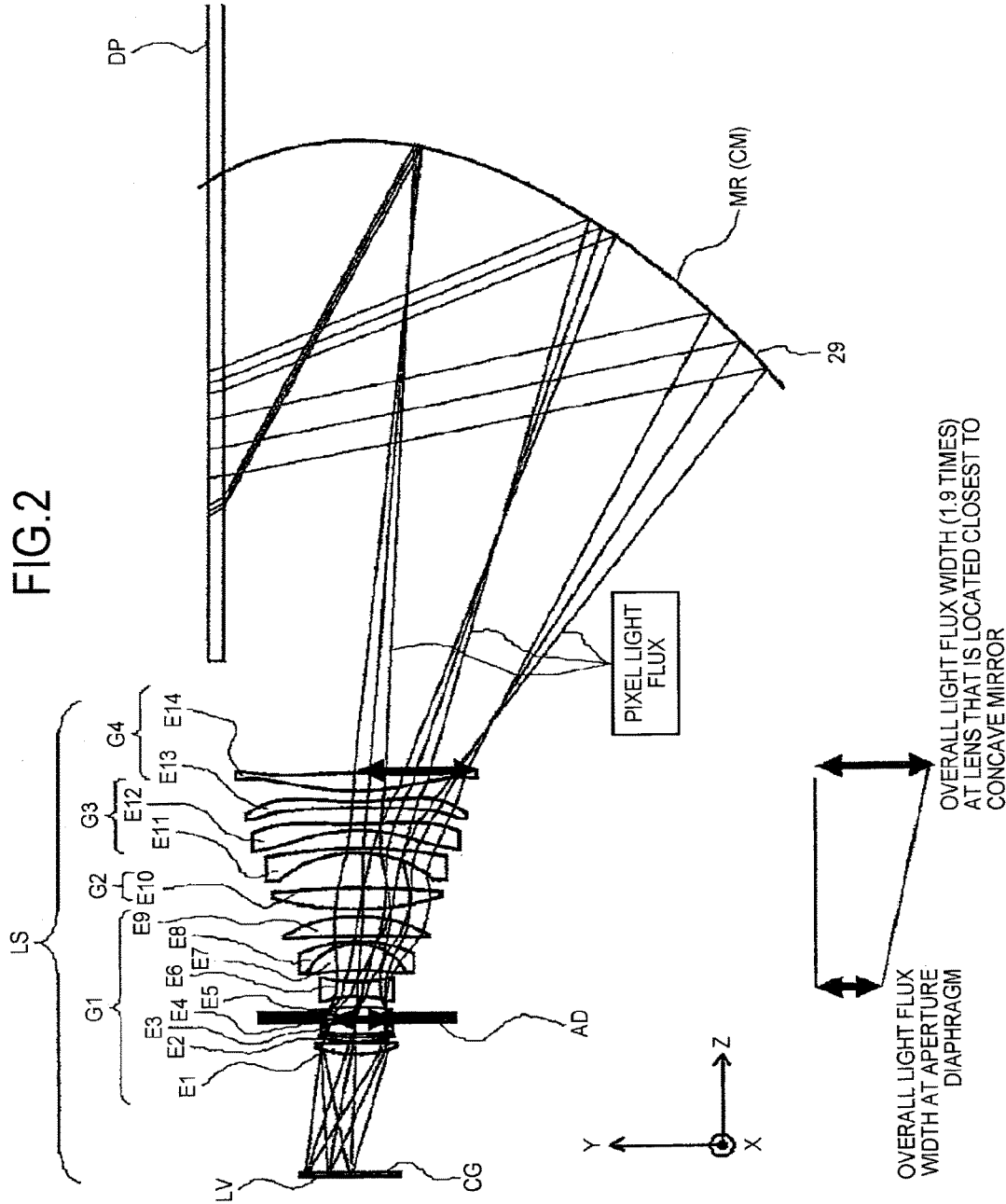
FIG. 2 is a cross-sectional view that illustrates part of the projective optical system of FIG. 1, principally a lens optical system and a reflective optical system, in an enlarged manner and in more details.
Figure 3:
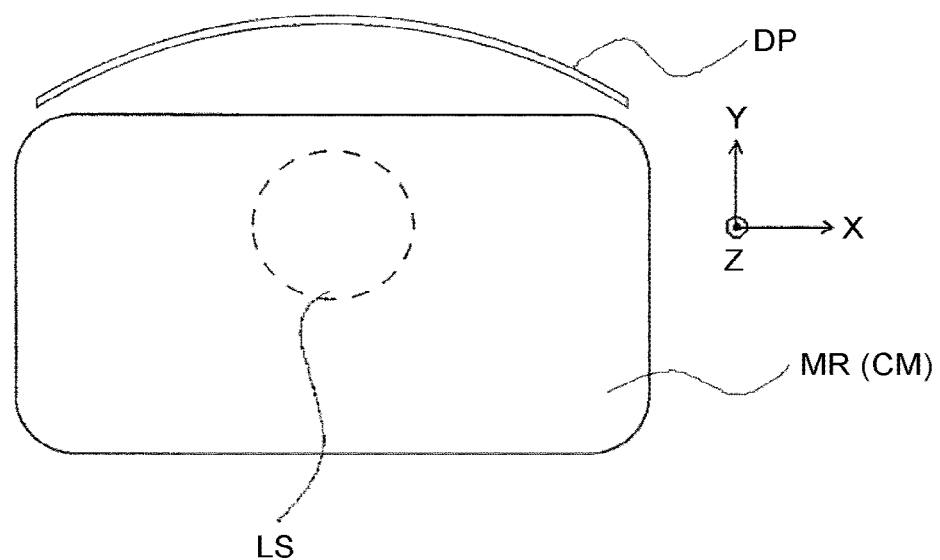
FIG. 3 is a cross-sectional view that illustrates the state of the projective optical system of FIG. 2 when the cross-sectional surface that is perpendicular to the optical axis of the lens optical system is viewed from the right side of FIG. 2 to the left side thereof.

Therefore, according to the present invention, in such a case, the shape of the dust preventing member is a partially cylindrical shape that is curved at a curvature in a direction that corresponds to the direction of the long side of the display screen of the image display element, typically a horizontal direction, and, for example, a transmissive optical element that forms an anamorphic surface that has different curvatures depending on a direction is used as the dust preventing member (see FIGS. 1 to 3 that will be explained in detail later). With the use of the dust preventing member that includes the above transmissive optical element, a configuration is such that a decrease in the lighting intensity at both ends of the display screen with respect to the horizontal direction on the projected surface of the screen, or the like, is prevented, while, as for the direction of the short side of the display screen, typically the vertical direction, a large difference is generated in the incident angle between light beams that are incident to the dust preventing member, i.e., between a light beam moving toward the lower side of the display screen and a light beam moving toward the upper side of the display screen, and the difference is offset within the lens optical system. Specifically, the light intensity distribution is given to the lens optical system corresponding to the vertical direction of the display screen so as to offset the difference in the incident angle relative to the dust preventing member.

Like in this case, the configuration of an optical system that is configured to combine a lens optical system and a reflective optical system that uses a concave mirror is bilaterally symmetric in the horizontal direction of the screen, and it is bilaterally asymmetric in the vertical direction thereof; therefore, it is more appropriate to have a configuration in which a lens optical system is combined with a dust preventing member that is formed into a partially cylindrical shape as described above, compared to a configuration that is asymmetric in the horizontal direction, i.e., a dust preventing member is tilted or a special light use efficiency distribution is formed within the lens optical system.

Japanese Patent No. 4396769 discloses a configuration that uses a dust preventing member that has a dome shape, i.e., that has a partially spherical shape with the same radius of curvature in all directions. In Japanese Patent No. 4396769, if the dust preventing member is shaped like a flat plate, there is a problem of degradation in a reflection of a peripheral light flux that has a small incident angle and in the image formation performance. Furthermore, Japanese Patent Application Laid-open No. 2010-152264 discloses that a dust preventing member includes a flat-plate central section and a flat-plate peripheral section that is adjacent to the central section and discloses a configuration in which the peripheral section is curved to the inlet side of projected light, and Japanese Patent Application Laid-open No. 2013-88727 discloses a configuration in which a cover that corresponds to a dust preventing member has a curved shape that makes smaller the incident angle and the emission angle of the principal light beam. The configurations of Japanese Patent Application Laid-open No. 2010-152264 and Japanese Patent Application Laid-open No. 2013-88727 do not give any consideration to the light intensity distribution due to a lens optical system of a projective optical system.

Conversely, the above-described configuration according to the present invention uses, as a dust preventing member, a transmissive optical element that has different curvatures in directions, i.e., a transmissive optical element that has, for example, a partially cylindrical shape and that forms an anamorphic surface.

Although the light that passes near the optical axis that corresponds to the lower end of the screen of the image display element has higher light use efficiency at the lens optical system, the light from the upper end of the screen of the image display element has lower light use efficiency at the lens optical system. To cancel the above difference in the light use efficiency at the lens optical system by using the transmissivity of the dust preventing member, it is preferable that the dust preventing member is in substantially a straight line without being curved in a direction that corresponds to the direction of the short side of the screen, typically a vertical direction.

In this case, the shape of the dust preventing member does not need to be strictly a straight line in a direction that corresponds to the vertical direction of the screen as long as it can establish the relationship among the incident angles corresponding to the vertical direction of the screen. Furthermore, it is necessary to prevent a degradation in the lighting intensity at ends in a direction that corresponds to the direction of the long side of the screen, typically a horizontal direction and, as a measure for this, it is preferable that the dust preventing member is curved with a significant curvature in the direction.

To satisfy all of them, the dust preventing member is a transmissive optical element that is shaped with different curvatures in directions, whereby a degradation in the lighting intensity at ends in the direction (horizontal direction) of the long side of the screen is prevented while the difference in the light use efficiency in the short-side direction (vertical direction) among the light fluxes that are emitted from the lens optical system is compensated by the light intensity distribution.

As described above, an explanation is given of a case where the present invention is applied to the projective optical system that has a configuration such that the image on the display screen of the image display element, such as a DMD, is enlarged by the lens optical system and the reflective optical system that is provided on the projected surface's side of the lens optical system and that uses a concave mirror with a flexibly curved surface that forms a concave reflective surface, and it is displayed on a projected surface of a screen, or the like. Specifically, a transmissive optical element that has a significant curvature corresponding to the direction of the long side of the screen (horizontal direction) is provided between the reflective optical system and the projected surface as a dust preventing member that prevents dust from entering a chassis that houses the projective optical system, or the like.

The projective optical system according to the present invention is not limited to this configuration, and it may be applied to a projective optical system that has a configuration such that the image on the display screen of the image display element, such as a DMD, is enlarged by a lens optical system and a reflective optical system that has sequentially arranged a flat mirror that has a flat reflective surface formed on the projected surface's side of the lens optical system and a concave mirror with a flexibly curved surface that forms a concave reflective surface, and it is displayed on a projected surface of a screen, or the like. In this case, a transmissive optical element that has a significant curvature corresponding to the direction of the long side of the screen (horizontal direction) is provided between the reflective optical system and the projected surface as a dust preventing member.

Furthermore, it may be applied to a projective optical system that has a configuration such that the image on the display screen of the image display element, such as a DMD, is enlarged by a lens optical system and a reflective optical system that includes a convex mirror that has a flexibly curved surface that forms a convex reflective surface on the projected surface's side of the lens optical system, and it is displayed on a projected surface of a screen, or the like. In this case, a transmissive optical element that has a significant curvature corresponding to the direction of the long side of the screen (horizontal direction) is provided between the reflective optical system and the projected surface as a dust preventing member.

Furthermore, if the present invention is applied to a projective optical system that has a configuration such that the image on the display screen of the image display element, such as a DMD, is enlarged by a lens optical system without a reflective optical system and is displayed on a projected surface of a screen, or the like, a transmissive optical element that has a significant curvature corresponding to the direction of the long side of the screen (horizontal direction) may be provided between the lens optical system and the projected surface as a dust preventing member.

Next, an explanation is given of a principled embodiment of the present invention on the basis of the above-described principles.

A projective optical system according to the present invention is a projective optical system that enlarges and projects, on a projected surface, an image that is displayed on an image display element, the projective optical system including: a lens optical system that includes a plurality of lenses; and a transmissive optical element that has an anamorphic surface and that is provided in an optical path between the lens optical system and the projected surface, wherein the transmissive optical element has a curvature with respect to a direction that corresponds to a longitudinal direction of a display screen of the image display element, and, on a cross-sectional surface that is perpendicular to a long side of the display screen of the image display element, and with respect to light that is emitted from the lens optical system and that enters the transmissive optical element, a light intensity of a first light flux that enters the transmissive optical element at a first incident angle is lower than a light intensity of a second light flux that is incident to the transmissive optical element at a second incident angle that is larger than the first incident angle (corresponding to claim 1).

To adjust the light intensity distribution of light that passes through the lens optical system, a configuration may be such that a unit that shields part of a light flux within the lens optical system is provided within the lens optical system (corresponding to claim 2).

Furthermore, a configuration may be such that a reflective optical system that has one or more reflective surfaces formed may be provided in an optical path between the lens optical system and the transmissive optical element (corresponding to claim 3).

Furthermore, the reflective surfaces of the reflective optical system may include one or more curved reflective surfaces (corresponding to claim 4).

The reflective optical system may include a flat return reflective surface that is provided between the lens optical system and the curved reflective surface (corresponding to claim 5).

The transmissive optical element may be fixedly provided without any change in a position relative to the image display element due to lens driving, such as focusing or changing of a magnifying power (corresponding to claim 6).

The transmissive optical element includes a first surface to which light is incident and a second surface from which light is emitted, the first surface and the second surface are in an optical path that leads from the display screen of the image display element to the projected surface, and surface shapes of the first surface and the second surface may be identical shapes at least in an area where a light flux is transmitted so as to be involved in forming an image so that they do not have a refractive power (corresponding to claim 7).

A configuration may be such that the first light flux is a light flux that passes through a peripheral section of the lens optical system among light fluxes that are involved in forming an image, and the second light flux is a light flux that passes near an optical axis of the lens optical system among light fluxes that are involved in forming an image (corresponding to claim 8).

Furthermore, the transmissive optical element may be an optical element that is located closest to a side of the projected surface in an optical path from the image display element to the projected surface (corresponding to claim 9).

The transmissive optical element may also function as a dust preventing member that prevents dust from entering an optical system that includes the lens optical system (corresponding to claim 10).

The lens optical system includes an aperture diaphragm, and a width of the overall light flux that comes from the display screen of the image display element and that passes through a lens that is located closest to the reflective optical system in the lens optical system may be more than 1.3 times a width of the overall light flux at a position of the aperture diaphragm on an arbitrary cross-sectional surface that includes an optical axis of the lens optical system (corresponding to claim 11).

On a cross-sectional surface that includes an optical axis of the lens optical system and that is perpendicular to the long side of the display screen of the image display element, there may be a difference of more than 45 degrees between an incident angle of a light beam toward an uppermost end of a projective screen on the projected surface and an incident angle of a light beam toward a lowermost end of the projective screen (corresponding to claim 12).

The lens optical system includes a plurality of lens groups and is configured to perform a focus adjustment by moving one or more lens groups among the lens groups, a lens group that is located closest to the image display element among the lens groups is a fixed lens group that has a positive refractive power and that does not move in accordance with a focus adjustment, and the aperture diaphragm that is fixed and does not move in accordance with a focus adjustment may be provided either inside the fixed lens group or near the fixed lens group (corresponding to claim 13).

Furthermore, a configuration may be such that the lens optical system includes at least three lens groups including a first lens group that has a positive refractive power; a second lens group that has a positive refractive power; and a third lens group that has a negative refractive power, and the first lens group, the second lens group, and the third lens group are sequentially arranged from the side of the image display element to the side of the projected surface (corresponding to claim 14).

Furthermore, a configuration may be such that the lens optical system includes a first lens group that is a fixed lens group that does not move in accordance with a focus adjustment and that has a positive refractive power; a second lens group that has a positive refractive power; and a third lens group that has a negative refractive power, the first lens group, the second lens group, and the third lens group are sequentially arranged from the side of the image display element to the side of the projected surface, and a unit that shields part of a light flux within the lens optical system is provided between the first lens group and the second lens group (corresponding to claim 15).

The transmissive optical element is in a straight line on a cross-sectional surface that is perpendicular to the long side of the display screen of the image display element, and the straight line may be perpendicular or parallel to the display screen of the image display element (corresponding to claim 16).

The curved reflective surface of the reflective optical system may be a concave reflective surface (corresponding to claim 17).

A configuration may be such that all intermediate images are formed between the return reflective surface and the concave reflective surface by the lens optical system (corresponding to claim 18).

A configuration may be such that, on a cross-sectional surface that includes an optical axis of the lens optical system and that is perpendicular to the long side of the display screen of the image display element, a pixel light flux from a pixel on an upper end of the display screen of the image display element is separated from a pixel light flux from a pixel on an lower end of the display screen of the image display element without being overlapped with each other at a lens that is located closest to a side of the projected surface in the lens optical system (corresponding to claim 19).

Moreover, an image projection device according to the present invention is configured to include any one of the above-described projective optical systems (corresponding to claim 20).

Next, an explanation is given of another specific embodiment and example of the projective optical system according to the present invention.

First Embodiment

Next, a detailed explanation is given of a specific first example that is a first embodiment of the above-described present invention.

First Example

The first example is an example of the specific configuration of the projective optical system according to the first embodiment of the present invention.

FIGS. 1 to 3 illustrate the configuration of a projective optical system according to the first example that is the first embodiment of the present invention, FIG. 1 is a cross-sectional view that illustrates the principal configuration of the overall projective optical system according to the first example along the cross-sectional surface that includes the optical axis and that is perpendicular to the long side of a display screen of an image display element, FIG. 2 is a cross-sectional view that illustrates part of the projective optical system of FIG. 1, principally the lens optical system, in more details, and FIG. 3 is a cross-sectional view that schematically illustrates the state of the projective optical system of FIG. 2 when the cross-sectional surface that is perpendicular to the optical axis of the lens optical system is viewed from the right side of FIG. 2 to the left side thereof.

Figure 8:
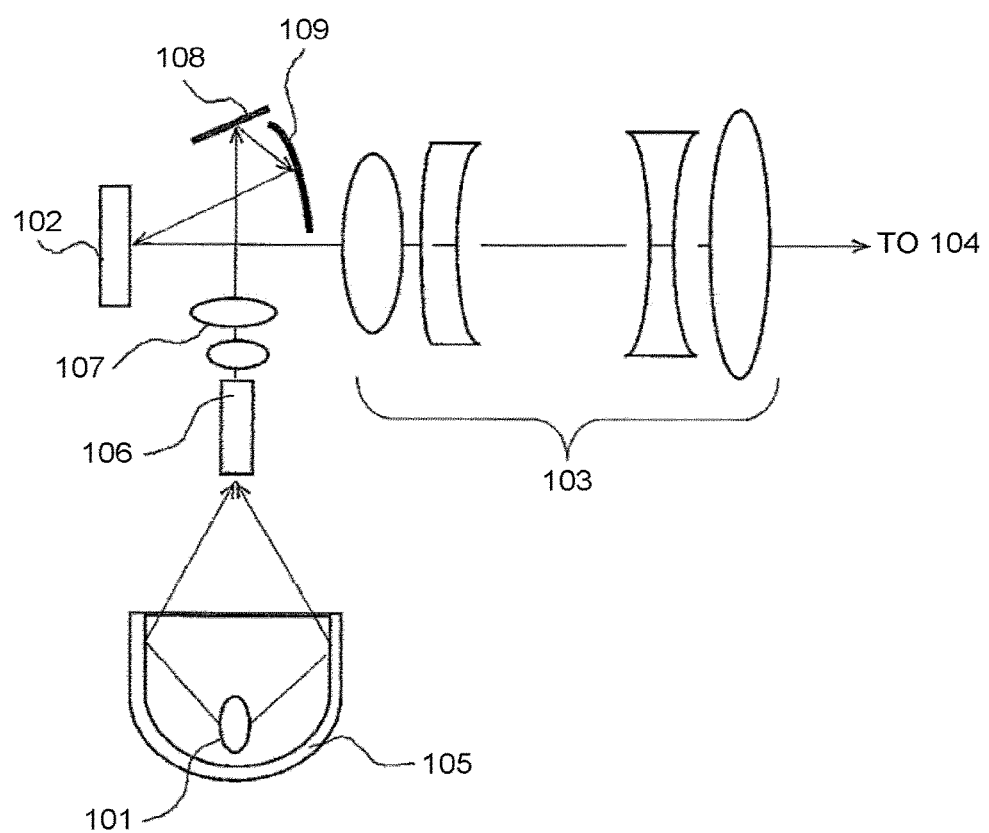
FIG. 8 is a cross-sectional view that schematically illustrates a schematic configuration of a conventional optical system in an image projection device, what is called a projector.

A digital micromirror device (DMD) is used as a light valve that is an image display element commonly in all of the following embodiments and examples. A liquid crystal display (LCD) panel or a Liquid Crystal on Silicon (LCOS) display panel may be used as the light valve that is the image display element, and there is particularly no limitation on the type of light valve that is used as the image display element according to the present invention. Furthermore, the illustration and explanation of an illumination optical system for guiding light emitted by the lamp illustrated in FIG. 8 to the light valve are omitted so as to prevent inconvenience of explanations; however, the light valve is actually irradiated with the light emitted by the lamp.

In FIGS. 1 and 2, the projective optical system enlarges and projects the image that is formed on the display screen of a light valve LV that uses a DMD as an image display element so as to form an image on a screen SC that forms a projected surface. The projective optical system includes a lens optical system LS, a reflective optical system MR, and a dust preventing member DP, which are sequentially arranged. Specifically, the image displayed on the light valve LV, such as a DMD, is enlarged and projected onto the projected surface of the screen SC by the projective optical system that includes the lens optical system LS, the reflective optical system MR, and the dust preventing member DP.

The lens optical system LS includes a first lens group G1, a second lens group G2, a third lens group G3, a fourth lens group G4, and an aperture diaphragm AD. The reflective optical system MR includes a concave mirror CM that has a flexibly curved surface, and the dust preventing member DP includes a transmissive optical element that has an anamorphic surface and that has a partially cylindrical shape.

The dust preventing member DP is a transmissive optical element that includes, for example, plate-like optical glass, it is in a straight line as illustrated in FIGS. 1 and 2 on the cross-sectional surface that includes the optical axis of the lens optical system LS and that is perpendicular to the long side of the display screen of the light valve LV that is the image display element, and it is formed into a partially cylindrical shape and has a circular shape with a radius of curvature of 200 mm, for example, in FIG. 3 that is viewed toward the light valve LV from the back of the concave mirror CM that is on the front side of the lens optical system LS. The dust preventing member DP has a layout such that the screen SC is perpendicular to a straight line that is parallel to the axis line of the cylindrical shape, i.e., a straight line along the straight cross-sectional shape on the cross-sectional surface that includes the optical axis and that is perpendicular to the long side of the display screen of the light valve LV as illustrated in FIG. 1.

Therefore, the angle of a light beam moving toward the lower end of the screen SC relative to a perpendicular (normal) of the surface of the dust preventing member DP, i.e., the incident angle relative to the dust preventing member DP is larger, while the incident angle of a light beam moving toward the upper end of the screen SC relative to the dust preventing member DP is smaller. Therefore, there is a large difference in the transmittance, i.e., the light use efficiency, at the dust preventing member DP between a light beam moving toward the lower end of the screen SC and a light beam moving toward the upper end thereof (in this case, the light use efficiency of a light beam moving toward the lower end of the screen is lower, and the light use efficiency of a light beam moving toward the upper end of the screen is higher).

Here, a detailed explanation is given of an optical system that leads from the display screen of the light valve LV that uses the DMD as the image display element to the screen SC that forms the projected surface.

In the projective optical system illustrated in FIGS. 1 and 2, flat-plate cover glass CG is provided on the display screen of the light valve LV to protect the display screen.

As described above, the lens optical system LS, which enlarges an image on the display screen of the light valve LV so as to form an image, includes the first lens group G1, the second lens group G2, the third lens group G3, and the fourth lens group G4 that are sequentially arranged from the side of the light valve LV, and the aperture diaphragm AD is provided within the first lens group G1.

The first lens group G1 includes a first lens E1, a second lens E2, a third lens E3, a fourth lens E4, a fifth lens E5, a sixth lens E6, a seventh lens E7, an eighth lens E8, a ninth lens E9, and the aperture diaphragm AD, and the first lens E1, the second lens E2, the third lens E3, the fourth lens E4, the aperture diaphragm AD, the fifth lens E5, the sixth lens E6, the seventh lens E7, the eighth lens E8, and the ninth lens E9 are sequentially arranged from the side of the light valve LV.

The first lens E1 is a positive lens that consists of a biconvex lens that has a convex surface that faces toward the light valve LV and that has a larger curvature (i.e., a smaller radius of curvature) compared to the one on the side of the projected surface, and it has aspheric surfaces formed both on the side of the projected surface and on the side of the light valve LV. The second lens E2 is a positive meniscus lens that has a concave surface facing toward the projected surface and has a convex formed on the side of the light valve LV.

The third lens E3 is a positive lens that consists of a biconvex lens that has a convex surface that faces toward the projected surface and that has a larger curvature compared to the one on the side of the light valve LV, and the fourth lens E4 is a negative meniscus lens that has a concave surface facing toward the light valve LV and has a convex formed on the side of the projected surface. The two lenses, i.e., the third lens E3 and the fourth lens E4, are tightly bonded to each other so as to be integrally joined, whereby a cemented lens is formed by joining the two pieces. Furthermore, the aperture diaphragm AD with an aperture radius of 5.71 is provided on the projected surface's side of the fourth lens E4.

The fifth lens E5 is a positive lens that consists of a biconvex lens that has a convex surface that faces toward the light valve LV and that has a larger curvature compared to the one on the side of the projected surface. The sixth lens E6 is a negative lens that consists of a biconcave lens that has a concave surface that faces toward the light valve LV and that has a larger curvature compared to the one on the side of the projected surface.

The seventh lens E7 is a positive meniscus lens that has a concave surface facing toward the light valve LV and has a convex formed on the side of the projected surface, and the eighth lens E8 is a negative meniscus lens that has a concave surface facing toward the light valve LV and has a convex formed on the side of the projected surface. The two lenses, i.e., the seventh lens E7 and the eighth lens E8, are tightly bonded to each other so as to be integrally joined, whereby a cemented lens is formed by joining the two pieces.

The ninth lens E9 is a positive meniscus lens that has a concave surface facing toward the light valve LV and has a convex formed on the side of the projected surface.

The second lens group G2 includes a tenth lens E10, and the tenth lens E10 is a positive lens that consists of a biconvex lens that has a convex surface that faces toward the light valve LV and that has a larger curvature compared to the one on the side of the projected surface.

The third lens group G3 includes an eleventh lens E11 and a twelfth lens E12, and the eleventh lens E11 and the twelfth lens E11 are sequentially arranged from the side of the light valve LV.

The eleventh lens E11 is a negative meniscus lens that has a concave surface facing toward the light valve LV and has a convex formed on the side of the projected surface. The twelfth lens E12 is a negative lens that consists of a biconcave lens that has a concave surface that faces toward the light valve LV and that has a larger curvature compared to the one on the side of the projected surface, and it has aspheric surfaces formed both on the side of the projected surface and on the side of the light valve LV.

The fourth lens group G4 includes a thirteenth lens E13 and a fourteenth lens E14, and the thirteenth lens E13 and the fourteenth lens E14 are sequentially arranged from the side of the light valve LV.

The thirteenth lens E13 is a negative lens that consists of a biconcave lens that has a concave surface that faces toward the projected surface and that has a larger curvature than the one on the side of the light valve LV, and it has aspheric surfaces formed both on the side of the projected surface and on the side of the light valve LV. The fourteenth lens E14 is a positive lens that consists of a biconvex lens that has a convex surface that faces toward the light valve LV and that has a larger curvature compared to the one on the side of the projected surface, and it has an aspheric surface formed on the side of the light valve LV.

In this case, the reflective optical system MR consists of the concave mirror CM that has a flexibly curved surface formed.

As described above, the dust preventing member DP is in a straight line on the cross-sectional surface that includes the optical axis of the lens optical system LS and that is perpendicular to the long side of the display screen of the light valve LV and, in this case, it includes a transmissive optical element that forms what is called an anamorphic surface that has a circular shape with a radius of curvature of 200 mm and has a partially cylindrical shape with a thickness of 3 mm when it is viewed toward the light valve LV from the back of the concave mirror CM that is on the front side of the lens optical system LS. In this case, the dust preventing member DP has a thickness of 3 mm, the two surfaces thereof are curved in a circular shape with a radius of curvature of 200 mm, and it does not have a refractive power.

In FIG. 1, the Z direction is a direction of the optical axis (the horizontal direction in FIG. 1), the Y direction is a direction that is perpendicular to the optical axis and that is parallel to the short side of the light valve LV (the vertical direction in FIG. 1), and the X direction is a direction that is perpendicular to the Z-Y cross-sectional surface (the direction perpendicular to the drawing plane in FIG. 1).

The reference marks that are described above and are used in FIGS. 1 and 2 are commonly used for the corresponding components in a second example and a third example in order to prevent explanations from being complicated due to an increase in the digit numbers of the reference marks; therefore, although the same reference marks as those in FIGS. 1 and 2 are attached, they do not always indicate the same configurations in the corresponding second and third examples.

The meanings of the marks that are commonly used in the first example to the third example are as follows.

r: a radius of curvature
d: a surface interval
nd: a refractive index of d line
ν: Abbe number
Ar: an effective radius (aperture radius) of an optical surface
EcY: eccentricity Y (eccentricity from an end section in the short-side direction, i.e., the vertical Y direction, of the light valve LV)
Ecα: eccentricity α (eccentricity from the optical axis on the YZ cross-sectional surface where the optical axis Z is perpendicular to the short side of the light valve LV)

The optical characteristics of each optical element according to the first example are described in the following Table 1.

TABLE 1

| Optical Characteristics | | | | | | | | | |
|---|---|---|---|---|---|---|---|---|---|
| Surface Number | R | d | nd | ν | Ar | EcY | Ecα | Remarks | |
| LB (0) | 1.0E+18 | 1.000 | | | | 0 | 0 | LV | |
| 1 | 1.0E+18 | 1.000 | 1.5168 | 64.2 | | 0 | 0 | CG | |
| 2 | 1.0E+18 | 28.000 | | | | 0 | | | |
| 3* | 22.097 | 2.675 | 1.5149 | 63.4 | | −1.260 | 0 | E1 | G1 |
| 4* | −104.519 | 0.301 | | | | −1.260 | 0 | | |

TABLE 1-continued

Optical Characteristics

| Surface Number | R | d | nd | ν | Ar | EcY | Ecα | Remarks | |
|---|---|---|---|---|---|---|---|---|---|
| 5 | 2.0E+01 | 1.109 | 1.8467 | 23.8 | | −1.260 | 0 | E2 | |
| 6 | 31.189 | 0.842 | | | | −1.260 | 0 | | |
| 7 | 40.663 | 2.888 | 1.497 | 81.6 | | −1.260 | 0 | E3 | |
| 8 | −20.173 | 0.803 | 1.7847 | 25.7 | | −1.260 | 0 | E4 | |
| Aperture-Diaphragm | −67.984 | 0.300 | | | 5.71 | −1.260 | 0 | AD | |
| 10 | 19.090 | 2.436 | 1.497 | 81.6 | | −1.260 | 0 | E5 | |
| 11 | −31.243 | 2.534 | | | | −1.260 | 0 | | |
| 12 | −16.064 | 3.524 | 1.9037 | 31.3 | | −1.260 | 0 | E6 | |
| 13 | 21.790 | 2.720 | | | | −1.260 | 0 | | |
| 14 | −39.047 | 6.251 | 1.5182 | 59.0 | | −1.260 | 0 | E7 | |
| 15 | −9.663 | 0.700 | 1.9108 | 35.3 | | −1.260 | 0 | E8 | |
| 16 | −21.305 | 1.180 | | | | −1.260 | 0 | | |
| 17 | −233.217 | 4.716 | 1.8052 | 25.5 | | −1.260 | 0 | E9 | |
| 18 | −22.768 | (6.157) | | | | −1.260 | 0 | | |
| 19 | 46.530 | 4.969 | 1.7859 | 43.9 | | −1.260 | 0 | E10 | G2 |
| 20 | −142.885 | (7.851) | | | | −1.260 | 0 | | |
| 21 | −19.591 | 1.000 | 1.8042 | 46.5 | | −1.260 | 0 | E11 | G3 |
| 22 | −76.793 | 4.247 | | | | −1.260 | 0 | | |
| 23* | −2.53E+01 | 1.500 | 1.5305 | 55.8 | | −1.260 | 0 | E12 | |
| 24* | 96.366 | (2.363) | | | | −1.260 | 0 | | |
| 25* | −155.616 | 1.413 | 1.5305 | 55.8 | | −1.260 | 0 | E13 | G4 |
| 26* | 50.327 | 2.506 | | | | −1.260 | 0 | | |
| 27* | 36.177 | 4.239 | 1.5305 | 55.8 | | −1.260 | 0 | E14 | |
| 28 | −73.654 | (147.783) | | | | −1.260 | 0 | | |
| Concave Mirror 29 | 1.0E+18 | 0.000 | | | | 3.050 | 5.09 | CM | MR |
| Dust Preventing Member 30 | −200 (Cylindrical Surface) | Thickness 3 mm | 1.5168 | 64.2 | | 24.000 | −90 | DP | |
| Dust Preventing Member 31 | −200 (Cylindrical Surface) | (−381.500) | | | | | | | |
| Screen 32 | | | | | | | | SC | |

The lens surface that is denoted by the surface number with "* (asterisk)" attached thereto in Table 1 is an aspheric surface.

The aspheric surface shape used here is defined by the following Equation (1), where the reciprocal (paraxial curvature) of the paraxial radius of curvature is C, the height from the optical axis is H, the conic constant is K, the aspheric surface degree in the direction of the optical axis is D, and the aspheric surface coefficient of each order is used, $E_4$: 4th order aspheric surface coefficient
$E_6$: 6th order aspheric surface coefficient
$E_8$: 8th order aspheric surface coefficient
$E_{10}$: 10th order aspheric surface coefficient
$E_{12}$: 12th order aspheric surface coefficient and the paraxial radius of curvature, the conic constant, and the aspheric surface coefficient are given to determine the shape.

$$D = \frac{C \cdot H^2}{1 + \sqrt{1 - (1+K) \cdot C^2 \cdot H^2} + E_4 \cdot H^4 + E_6 \cdot H^6 + E_8 \cdot H^8 + E_{10} \cdot H^{10} + E_{12} \cdot H^{12} + \ldots} \quad (1)$$

Specifically, in Table 1, the optical surfaces with "*" attached thereto, i.e., the 3rd surface, the 4th surface, the 23rd surface, the 24th surface, the 25th surface, the 26th surface, and the 27th surface, are aspheric surfaces, and the parameters of each of the aspheric surfaces in Equation (1) are described in the following Table 2. As for the aspheric surface coefficient, "En" indicates "a power of 10", i.e., "×10$^n$" and, for example, "E-05" indicates "×10$^{-5}$". The same holds for the other examples.

TABLE 2

Aspheric Surface Parameter

| Surface Number | 3 | 4 | 23 | 24 |
|---|---|---|---|---|
| K | 0 | 0 | 0 | 0 |
| $A_4$ | 7.781831E−05 | 6.748049E−05 | 1.704490E−05 | −3.439239E−05 |

TABLE 2-continued

| Aspheric Surface Parameter | | | | |
|---|---|---|---|---|
| $A_6$ | 3.753011E−07 | 4.663791E−07 | 4.579417E−08 | 6.038291E−08 |
| $A_8$ | −4.411478E−09 | −4.459039E−09 | −3.844678E−11 | −1.629223E−10 |
| $A_{10}$ | 9.939371E−11 | 1.036997E−10 | 3.745322E−14 | 1.434097E−13 |
| $A_{12}$ | | | | |

| Surface Number | 25 | 26 | 27 |
|---|---|---|---|
| K | 0 | 0 | 0 |
| $A_4$ | 5.848393E−06 | −3.834286E−05 | −1.999196E−05 |
| $A_6$ | −5.719755E−08 | 1.483629E−08 | 2.316157E−08 |
| $A_8$ | −2.904051E−12 | −9.276431E−11 | −4.711453E−11 |
| $A_{10}$ | 6.191129E−14 | 1.234100E−14 | −2.666117E−15 |
| $A_{12}$ | 9.465043E−17 | 2.591415E−16 | |

Furthermore, the surface interval d between the 18th surface and the 19th surface, between the 20th surface and the 21st surface, and between the 24th surface and the 25th surface in Table 1 indicates the group interval between the first lens group G1 and the second lens group G2, between the second lens group G2 and the third lens group G3, and between the third lens group G3 and the fourth lens group G4, and in the illustrated case, the screen size is, for example, 80 inches. The magnifying power can be changed by changing the group intervals, and the values in the following table are obtained in the case where the screen size is 80 inches and in the case where it is 48 inches.

TABLE 3

| | Group Interval | |
|---|---|---|
| Surface Number | 80 Inches | 48 Inches |
| 18-19 | 6.157 | 1.719 |
| 20-21 | 7.851 | 8.421 |
| 24-25 | 2.363 | 3.943 |
| 28-29 | 147.783 | 150.070 |
| 31-32 | −381.500 | −247.709 |

The overall light flux width at the aperture diaphragm AD and the overall light flux width at the 28th surface are obtained as described in the following Table 4 if the screen size is 80 inches.

TABLE 4

| Overall Light Flux Width Ratio | |
|---|---|
| | Overall Light Flux Width (80 Inches) |
| Aperture Diaphragm AD | 11.42 mm |
| 28th Surface | 21.81 mm |
| Ratio | 1.9 Times |

The 29th surface (the surface number) of the concave mirror CM that is indicated in Table 1 indicates a flexibly curved surface, and the shape of the flexibly curved surface is defined by the following Equation (2). Specifically, the sag degree of the surface that is parallel to the Z axis that is the optical axis is z, the vertex curvature (CUY) is c, the conic constant is k, and the coefficient of the monomial $x^m y^n$ is $C_j$ and, based on the above, the shape is determined by using the sag degree z in the direction of the Z axis that is the optical axis.

$$z = \frac{cr^2}{1+\sqrt{1-(1+k)c^2r^2}} + \sum_{j=2}^{72} c_j x^m y^n \quad (2)$$

Here, the coefficients and the constants, such as $C_j$, are given by the following Table 5.

TABLE 5

| Coefficients And Constants Of Flexibly Curved Surface | |
|---|---|
| Coefficients, And The Like | Surface Number 29 |
| c | 0 |
| k: Conic Constant | 0 |
| $c_2$: $y$ | 0 |
| $c_3$: $x^2$ | −0.010400854 |
| $c_4$: $y^2$ | −0.010799926 |
| $c_5$: $x^2 y$ | 2.21508E−05 |
| $c_6$: $y^3$ | −1.63187E−05 |
| $c_7$: $x^4$ | 7.31392E−07 |
| $c_8$: $x^2 y^2$ | 1.6529E−06 |
| $c_9$: $y^4$ | −7.13048E−07 |
| $c_{10}$: $x^4 y$ | 6.39024E−10 |
| $c_{11}$: $x^2 y^3$ | 2.57584E−08 |
| $c_{12}$: $y^5$ | −2.353E−08 |
| $c_{13}$: $x^6$ | −1.65847E−10 |
| $c_{14}$: $x^4 y^2$ | −4.06368E−10 |
| $c_{15}$: $x^2 y^4$ | 4.34666E−10 |
| $c_{16}$: $y^6$ | −2.57497E−10 |
| $c_{17}$: $x^6 y$ | −1.0773E−10 |
| $c_{18}$: $x^4 y^3$ | −5.64734E−12 |
| $c_{19}$: $x^2 y^5$ | 7.8582E−12 |
| $c_{20}$: $y^7$ | 3.39251E−13 |
| $c_{21}$: $x^8$ | 2.10987E−14 |
| $c_{22}$: $x^6 y^2$ | 3.47961E−14 |
| $c_{23}$: $x^4 y^4$ | −7.74361E−14 |
| $c_{24}$: $x^2 y^6$ | 2.25221E−14 |
| $c_{25}$: $y^8$ | 1.73926E−14 |
| $c_{26}$: $x^8 y$ | 1.46092E−16 |
| $c_{27}$: $x^6 y^3$ | 1.96004E−16 |
| $c_{28}$: $x^4 y^5$ | −1.46187E−15 |
| $c_{29}$: $x^2 y^7$ | −8.26116E−16 |
| $c_{30}$: $y^9$ | 1.05346E−17 |
| $c_{31}$: $x^{10}$ | −1.18951E−18 |
| $c_{32}$: $x^8 y^2$ | −1.16562E−18 |
| $c_{33}$: $x^6 y^4$ | −2.92062E−18 |
| $c_{34}$: $x^4 y^6$ | −1.09612E−17 |
| $c_{35}$: $x^2 y^8$ | −6.60739E−18 |
| $c_{36}$: $y^{10}$ | −6.143741E−19 |

FIG. 2 illustrates part of FIG. 1, principally the lens optical system LS, the reflective optical system MR, and the dust preventing member DP in an enlarged manner in details, and it illustrates the state of pixel light fluxes that are separated within the lens optical system LS. On the cross-sectional surface of FIG. 2, after pixel light fluxes are emitted from the display screen of the light valve LV on the upper end, the center, and the lower end thereof in the vertical direction illustrated, the light fluxes are incident to the lens optical system LS, are temporarily overlapped with one another near the aperture diaphragm AD, are completely separated from one another at the lens that is located closest to the concave mirror CM, are temporarily collected so as to form an intermediate image, and are then reflected by the concave mirror CM.

There are two advantages of completely separating the pixel light fluxes as described above. Specifically, one is that the image quality is improved, and the other is that the light use efficiency of each of the pixel light fluxes within the lens optical system is easily controlled.

First, an explanation is given of the former, i.e., an improvement in the image quality. As it is clear from FIG. 1, the distance from the concave mirror MR(CM) to the lower end of the screen SC is significantly different from that from the concave mirror MR(CM) to the upper end of the screen SC (this can be said as the characteristics of up-close projectors). Therefore, it is necessary to apply an entirely different focusing effect in the lens optical system LS to a pixel light flux moving toward the lower end of the screen SC and to a pixel light flux moving toward the upper end of the screen SC. Such an effect can be fully generated by the concave mirror CM; however, in such a case, a desired image quality cannot be expected.

Therefore, pixel light fluxes are completely separated within the lens optical system LS, particularly, they are completely separated at the area where they pass through an aspheric surface lens, and a different effect is applied to each of the pixel light fluxes, whereby a desired image quality can be obtained.

Next, an explanation is given of the latter, i.e., a control on the light use efficiency. There is a difference in the distance over which each pixel light flux passes through a lens or in the angle at which it is incident to a lens surface; therefore, some difference occurs in the light use efficiency among pixel light fluxes. The difference in the light use efficiency is controlled by using a lens design as described below. In the first example, the light use efficiency of a pixel light flux from the lower end of the display screen of the light valve LV is set to be higher within the lens optical system LS, and the light use efficiency of a pixel light flux from the upper end of the display screen of the light valve LV is set to be lower. Thus, the applied effect is opposite to a difference in the light use efficiency at the dust preventing member DP, and even light use efficiency can be obtained in the range from the lower end of the screen SC to the upper end thereof. In the first example, the light use efficiency at the dust preventing member DP and the light use efficiency at the lens optical system LS are offset by each other; thus, the light use efficiency can be even and, at the same time, the image quality can be even.

The above is represented in terms of the light intensity, i.e., on the cross-sectional surface that includes the optical axis and that is perpendicular to the long side of the display screen of the light valve LV that is an image display element, as for the light that is emitted from the lens optical system LS and that is incident to the dust preventing member (a transmissive optical element) DP, it is possible to prevent variations in the lighting intensity at each location of an image by using the relation such that the light intensity of a first light flux that is incident to the transmissive optical element DP at a first incident angle and that is farthest from the optical axis of the lens optical system LS is lower than the light intensity of a second light flux that is incident to the transmissive optical element DP at a second incident angle and that is closer to the optical axis of the lens optical system compared to the first light flux.

The width of the overall light flux is used as a measure of separated pixel light fluxes and, according to the first example, the overall light flux width on the lens surface that is located closest to the concave mirror CM is 1.9 times the overall light flux width at the aperture diaphragm AD on the cross-sectional surface of FIG. 2 as described in Table 4, and it can be understood from FIG. 2 that the light fluxes are appropriately separated.

Furthermore, as it is clear from FIGS. 2 and 3, the shape of the dust preventing member DP is a cylindrical shape with a radius of curvature of 200 mm, and the incident angle of a light beam moving in the horizontal direction of the screen SC is decreased, whereby the light use efficiency is improved.

Second Embodiment

Next, a detailed explanation is given of the specific second example that is a second embodiment of the above-described present invention.

Second Example

The second example is an example of the specific configuration of a projective optical system according to the second embodiment of the present invention.

Figure 4:
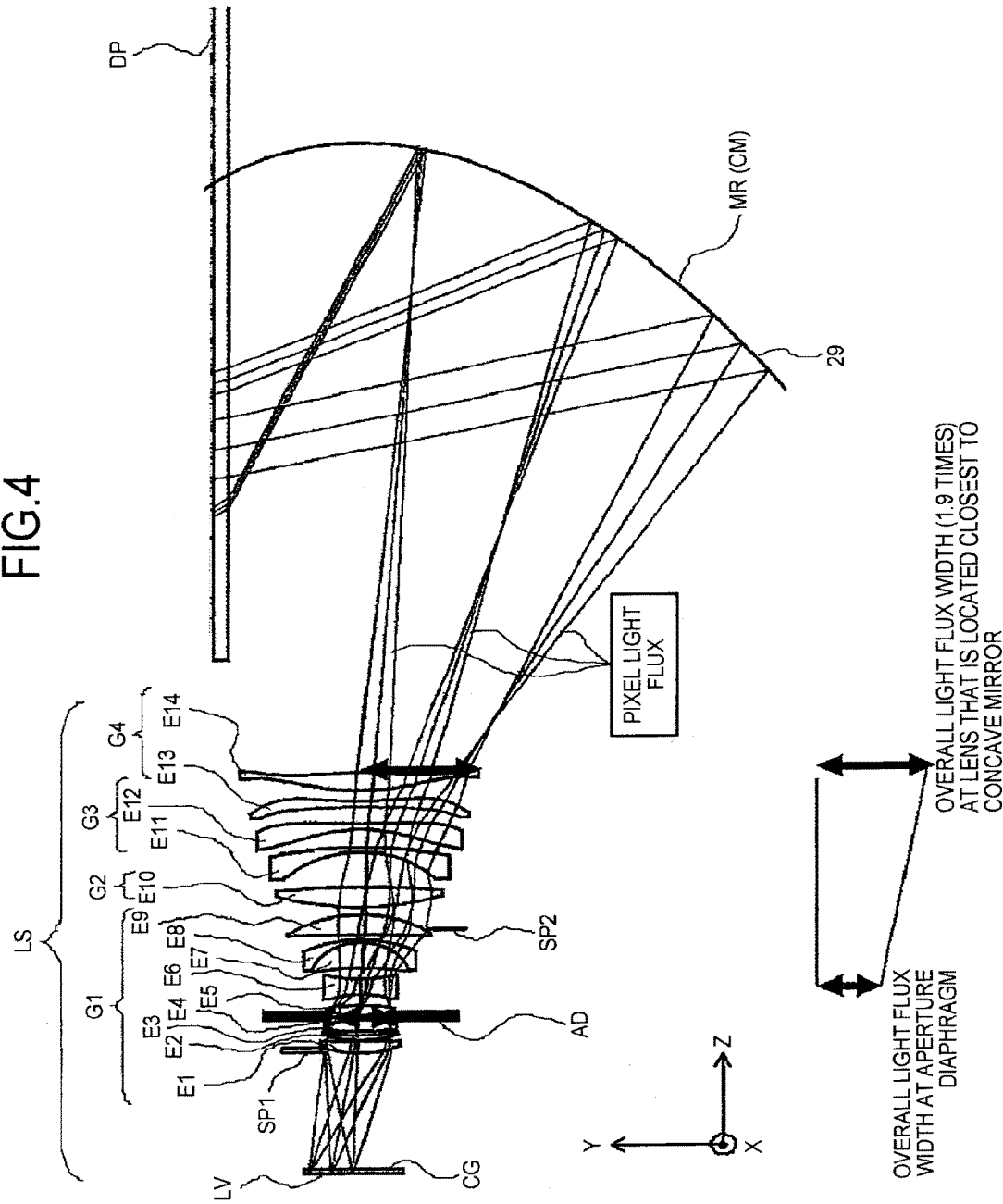
FIG. 4 is a cross-sectional view that illustrates part of the projective optical system, principally the lens optical system, according to a second example that is a second embodiment of the present invention in details along the cross-sectional surface that includes the optical axis and that is perpendicular to the long side of the display screen of the image display element together with the optical path.

FIG. 4 illustrates the configuration of the projective optical system according to the second example that is the second embodiment of the present invention, and it is a cross-sectional view that illustrates part of the projective optical system, principally the lens optical system, in details. The configuration of the second example is basically the same as that of the first example, and it is different only in the details; therefore, it is the same as the first example with respect to the configurations illustrated in FIGS. 1 and 3.

With reference to FIGS. 1, 3 and 4, an explanation is given of the configuration of the projective optical system according to the second example that is the second embodiment of the present invention. With regard to the schematic and principal configuration of the overall projective optical system, in the same manner as in the first example, a reference is made to FIG. 1 that is a schematic cross-sectional view that is illustrated along the cross-sectional surface that includes the optical axis and that is perpendicular to the long side of the display screen of the image display element, a reference is made to FIG. 4 that is a cross-sectional view that illustrates part of the projective optical system of FIG. 1, principally the lens optical system, in more details, and a reference is made to FIG. 3 that is a cross-sectional view that illustrates the state of the projective optical system of FIG. 2 when the cross-sectional surface that is perpendicular to the optical axis of the lens optical system is viewed from the right side of FIG. 4 to the left side thereof.

In FIGS. 1 and 4, the projective optical system enlarges and projects the image that is formed on the display screen of the light valve LV, which uses a DMD as an image display element, so as to form an image on the screen SC that forms a projected surface. The projective optical system includes the lens optical system LS, the reflective optical system MR, and the dust prevent g member DP, which are sequentially arranged. Specifically, the image displayed on the light valve LV, such as a DMD, is enlarged and projected onto the projected surface of the screen SC by the projective optical system that includes the lens optical system LS, the reflective optical system MR, and the dust preventing member DP.

The lens optical system LS includes the first lens group G1, the second lens group G2, the third lens group G3, the fourth lens group G4, and the aperture diaphragm AD. The reflective optical system MR includes the concave mirror CM that has a flexibly curved surface, and the dust preventing member DP includes a transmissive optical element that has an anamorphic surface and that has a partially cylindrical shape.

The dust preventing member DP is a transmissive optical element that includes, for example, plate-like optical glass, it is in a straight line as illustrated in FIGS. 1 and 4 on the cross-sectional surface that includes the optical axis of the lens optical system LS and that is perpendicular to the long side of the display screen of the light valve LV that is the image display element, and it is formed into a partially cylindrical shape and has a circular shape with a radius of curvature of 200 mm, for example, in FIG. 3 that is viewed toward the light valve LV from the back of the concave mirror CM that is on the front side of the lens optical system LS. The dust preventing member DP has a layout such that the screen SC is perpendicular to a straight line that is parallel to the axis line of the cylindrical shape, i.e., a straight line along the straight cross-sectional shape on a cross-sectional surface that includes the optical axis and that is perpendicular to the long side of the display screen of the light valve LV as illustrated in FIG. 1.

Therefore, the angle of a light beam moving toward the lower end of the screen SC relative to a perpendicular (normal) of the surface of the dust preventing member DP, i.e., the incident angle relative to the dust preventing member DP is larger, while the incident angle of a light beam moving toward the upper end of the screen SC relative to the dust preventing member DP is smaller. Therefore, there is a large difference in the transmittance, i.e., the light use efficiency, at the dust preventing member DP between a light beam moving toward the lower end of the screen SC and a light beam moving toward the upper end thereof (in this case, the light use efficiency of a light beam moving toward the lower end of the screen is lower, and the light use efficiency of a light beam moving toward the upper end of the screen is higher).

Here, a detailed explanation is given of an optical system that leads from the display screen of the light valve LV that uses the DMD as the image display element to the screen SC that forms the projected surface.

In the projective optical system illustrated in FIGS. 1 and 4, the flat-plate cover glass CG is provided on the display screen of the light valve LV to protect the display screen.

As described above, the lens optical system LS, which enlarges an image on the display screen of the light valve LV so as to form an image, includes the first lens group G1, the second lens group G2, the third lens group G3, and the fourth lens group that are sequentially arranged from the side of the light valve LV, and the aperture diaphragm AD is provided within the first lens group G1.

The first lens group G1 includes the first lens E1, the second lens E2, the third lens E3, the fourth lens E4, the fifth lens E5, the sixth lens E6, the seventh lens E7, the eighth lens E8, the ninth lens E9, and the aperture diaphragm AD, and the first lens E1, the second lens E2, the third lens E3, the fourth lens E4, the aperture diaphragm AD, the fifth lens E5, the sixth lens E6, the seventh lens E7, the eighth lens E8, and the ninth lens E9 are sequentially arranged from the side of the light valve LV.

The first lens E1 is a positive lens that consists of a biconvex lens that has a convex surface that faces toward the light valve LV and that has a larger curvature (i.e., a smaller radius of curvature) compared to the one on the side of the projected surface, and it has aspheric surfaces formed both on the side of the projected surface and on the side of the light valve LV. A light shielding member SP1 that has an aperture radius of 6.7 mm is provided on the light valve LV's side of the first lens E1. The second lens E2 is a positive meniscus lens that has a concave surface facing toward the projected surface and has a convex formed on the side of the light valve LV.

The third lens E3 is a positive lens that consists of a biconvex lens that has a convex surface that faces toward the projected surface and that has a larger curvature compared to the one on the side of the light valve LV, and the fourth lens E4 is a negative meniscus lens that has a concave surface facing toward the light valve LV and has a convex formed on the side of the projected surface. The two lenses, i.e., the third lens E3 and the fourth lens E4, are tightly bonded to each other so as to be integrally joined, whereby a cemented lens is formed by joining the two pieces. Furthermore, the aperture diaphragm AD with an aperture radius of 5.71 is provided closer to the projected surface's side of the fourth lens E4.

The fifth lens E5 is a positive lens that consists of a biconvex lens that has a convex surface that faces toward the light valve LV and that has a larger curvature compared to the one on the side of the projected surface. The sixth lens E6 is a negative lens that includes a biconcave lens that has a concave surface that faces toward the light valve LV and that has a larger curvature compared to the one on the side of the projected surface.

The seventh lens E7 is a positive meniscus lens that has a concave surface facing toward the light valve LV and has a convex formed on the side of the projected surface, and the eighth lens E8 is a negative meniscus lens that has a concave surface facing toward the light valve LV and has a convex formed on the side of the projected surface. The two lenses, i.e., the seventh lens E7 and the eighth lens E8, are tightly bonded to each other so as to be integrally joined, whereby a cemented lens is formed by joining the two pieces.

The ninth lens E9 is a positive meniscus lens that has a concave surface facing toward the light valve LV and has a convex formed on the side of the projected surface. A light shielding member SP2 that has an aperture radius of 12.6 mm is formed on the projected surface's side of the ninth lens E9.

The second lens group G2 consists of only the tenth lens E10, and the tenth lens E10 is a positive lens that consists of a biconvex lens that has a convex surface that faces toward the light valve LV and that has a larger curvature compared to the one on the side of the projected surface.

The third lens group G3 includes the eleventh lens E11 and the twelfth lens E12, and the eleventh lens E11 and the twelfth lens E12 are sequentially arranged from the side of the light valve LV.

The eleventh lens E11 is a negative meniscus lens that has a concave surface facing toward the light valve LV and has a convex formed on the side of the projected surface. The twelfth lens E12 is a negative lens that consists of a biconcave lens that has a concave surface that faces toward the light valve LV and that has a larger curvature compared to the one on the side of the projected surface, and it has aspheric surfaces formed both on the side of the projected surface and on the side of the light valve LV.

The fourth lens group G4 includes the thirteenth lens E13 and the fourteenth lens E14, and the thirteenth lens E13 and the fourteenth lens E14 are sequentially arranged from the side of the light valve LV.

The thirteenth lens E13 is a negative lens that consists of a biconcave lens that has a concave surface that faces toward the projected surface and that has a larger curvature than the one on the side of the light valve LV, and it has aspheric surfaces formed both on the side of the projected surface and on the side of the light valve LV. The fourteenth lens E14 is a positive lens that consists of a biconvex lens that has a convex surface that faces toward the light valve LV and that has a larger curvature compared to the one on the side of the projected surface, and it has an aspheric surface formed on the side of the light valve LV.

In this case, the reflective optical system MR consists of the concave mirror CM that has a flexibly curved surface formed.

As described above, the dust preventing member DP is in a straight line on the cross-sectional surface that includes the optical axis of the lens optical system LS and that is perpendicular to the long side of the display screen of the light valve LV and, in this case, it includes a transmissive optical element that forms what is called an anamorphic surface that has a circular shape with a radius of curvature of 200 mm and has a partially cylindrical shape with a thickness of 3 mm when it is viewed toward the light valve LV from the back of the concave mirror CM that is on the front side of the lens optical system LS. In this case, the dust preventing member DP has a thickness of 3 mm, the two surfaces thereof are curved in a circular shape with a radius of curvature of 200 mm, and it does not have a refractive power.

The reference marks that are described above and are used in FIGS. 1 and 4 are commonly used for the corresponding components in the first example and the third example in order to prevent explanations from being complicated due to an increase in the digit numbers of the reference marks; therefore, although the same reference marks as those in FIGS. 1 and 4 are attached, they do not always indicate the same configurations in the corresponding first and third examples.

The optical characteristics of each optical element according to the second example are described in the following Table.

TABLE 6

| Surface Number | r | d | Nd | ν | Ar | EcY | Ecα | Remarks | |
|---|---|---|---|---|---|---|---|---|---|
| LB (0) | 1.0E+18 | 1.000 | | | | 0 | 0 | LV | |
| 1 | 1.0E+18 | 1.000 | 1.5168 | 64.2 | | 0 | 0 | CG | |
| 2 | 1.0E+18 | 28.000 | | | | 0 | | | |
| 3* | 22.097 | 2.675 | 1.5149 | 63.4 | 6.7 | −1.260 | 0 | E1 | G1 |
| 4* | −104.519 | 0.301 | | | | −1.260 | 0 | | |
| 5 | 2.0E+01 | 1.109 | 1.8467 | 23.8 | | −1.260 | 0 | E2 | |
| 6 | 31.189 | 0.842 | | | | −1.260 | 0 | | |
| 7 | 40.663 | 2.888 | 1.497 | 81.6 | | −1.260 | 0 | E3 | |
| 8 | −20.173 | 0.803 | 1.7847 | 25.7 | | −1.260 | 0 | E4 | |
| Aperture Diaphragm | −67.984 | 0.300 | | | 5.71 | −1.260 | 0 | AD | |
| 10 | 19.090 | 2.436 | 1.497 | 81.6 | | −1.260 | 0 | E5 | |
| 11 | −31.243 | 2.534 | | | | −1.260 | 0 | | |
| 12 | −16.064 | 3.524 | 1.9037 | 31.3 | | −1.260 | 0 | E6 | |
| 13 | 21.790 | 2.720 | | | | −1.260 | 0 | | |
| 14 | −39.047 | 6.251 | 1.5182 | 59.0 | | −1.260 | 0 | E7 | |
| 15 | −9.663 | 0.700 | 1.9108 | 35.3 | | −1.260 | 0 | E8 | |
| 16 | −21.305 | 1.180 | | | | −1.260 | 0 | | |
| 17 | −233.217 | 4.716 | 1.8052 | 25.5 | 12.6 | −1.260 | 0 | E9 | |
| 18 | −22.768 | (6.157) | | | | −1.260 | 0 | | |
| 19 | 46.530 | 4.969 | 1.7859 | 43.9 | | −1.260 | 0 | E10 | G2 |
| 20 | −142.885 | (7.851) | | | | −1.260 | 0 | | |
| 21 | −19.591 | 1.000 | 1.8042 | 46.5 | | −1.260 | 0 | E11 | G3 |
| 22 | −76.793 | 4.247 | | | | −1.260 | 0 | | |
| 23* | −2.53E+01 | 1.500 | 1.5305 | 55.8 | | −1.260 | 0 | E12 | |
| 24* | 96.366 | (2.363) | | | | −1.260 | 0 | | |
| 25* | −155.616 | 1.413 | 1.5305 | 55.8 | | −1.260 | 0 | E13 | G4 |
| 26* | 50.327 | 2.506 | | | | −1.260 | 0 | | |
| 27* | 36.177 | 4.239 | 1.5305 | 55.8 | | −1.260 | 0 | E14 | |
| 28 | −73.654 | (147.783) | | | | −1.260 | 0 | | |
| Concave Mirror 29 | 1.0E+18 | 0.000 | | | | 3.050 | 5.09 | CM | MR |
| Dust Preventing Member 30 | −200 (Cylindrical Surface) | Thickness 3 mm | 1.5168 | 64.2 | | 24.000 | −90 −90 | DP | |

TABLE 6-continued

Optical Characteristics

| Surface Number | r | d | Nd | ν | Ar | EcY | Ecα | Remarks |
|---|---|---|---|---|---|---|---|---|
| Dust Preventing Member 31 | −200 (Cylindrical Surface) | (−381.500) | | | | | | |
| Screen 32 | | | | | | | 0 | SC |

The lens surface that is denoted by the surface number with "*" attached thereto in Table 6 is an aspheric surface.

Specifically, in Table 6, the optical surfaces with "*" attached thereto, i.e., the 3rd surface, the 4th surface, the 23rd surface, the 24th surface, the 25th surface, the 26th surface, and the 27th surface, are aspheric surfaces, and the parameters of each of the aspheric surfaces in Equation (1) are described in the following Table 7.

TABLE 7

Aspheric Surface Parameter

| Surface Number | 3 | 4 | 23 | 24 |
|---|---|---|---|---|
| K | 0 | 0 | 0 | 0 |
| $A_4$ | 7.781831E−05 | 6.748049E−05 | 1.704490E−05 | −3.439239E−05 |
| $A_6$ | 3.753011E−07 | 4.663791E−07 | 4.579417E−08 | 6.038291E−08 |
| $A_8$ | −4.411478E−09 | −4.459039E−09 | −3.844678E−11 | −1.629223E−10 |
| $A_{10}$ | 9.939371E−11 | 1.036997E−10 | 3.745322E−14 | 1.434097E−13 |
| $A_{12}$ | | | | |

| Surface Number | 25 | 26 | 27 |
|---|---|---|---|
| K | 0 | 0 | 0 |
| $A_4$ | 5.848393E−06 | −3.834286E−05 | −1.999196E−05 |
| $A_6$ | −5.719755E−08 | 1.483629E−08 | 2.316157E−08 |
| $A_8$ | −2.904051E−12 | −9.276431E−11 | −4.711453E−11 |
| $A_{10}$ | 6.191129E−14 | 1.234100E−14 | −2.666117E−15 |
| $A_{12}$ | 9.465043E−17 | 2.591415E−16 | |

Furthermore, the surface interval d between the 18th surface and the 19th surface, between the 20th surface and the 21st surface, between the 24th surface and the 25th surface, between the 28th surface and the 29th surface, and between the 31st surface and the 32nd surface in Table 6 indicates the group interval between the first lens group G1 and the second lens group G2, between the second lens group G2 and the third lens group G3, between the third lens group G3 and the fourth lens group G4, between the fourth lens group G4 and the concave mirror CM, and between the dust preventing member DP and the screen SC and, in the illustrated case, the screen size is, for example, 80 inches. The magnifying power can be changed by changing the group intervals, and the values in the following Table 8 are obtained in the case where the screen size is 80 inches and in the case where it is 48 inches.

TABLE 8

Group Interval

| Surface Number | Group Interval | |
|---|---|---|
| | 80 Inches | 48 Inches |
| 18-19 | 6.157 | 1.719 |
| 20-21 | 7.851 | 8.421 |
| 24-25 | 2.363 | 3.943 |
| 28-29 | 147.783 | 150.070 |
| 31-32 | −381.500 | −247.709 |

The overall light flux width at the aperture diaphragm AD and the overall light flux width at the 28th surface are obtained as described in the following Table 9 if the screen size is 80 inches.

TABLE 9

Overall Light Flux Width Ratio

|  | Overall Light Flux Width (80 Inches) |
|---|---|
| Aperture Diaphragm AD 9th Surface | 11.42 mm |
| 28th Surface | 21.81 mm |
| Ratio | 1.9 Times |

The 29th surface (the surface number) of the concave mirror CM that is indicated in Table 6 indicates a flexibly curved surface, and the shape of the flexibly curved surface is defined by the above-described Equation (2).

Here, the coefficients and the constants, such as are given by the following Table 10.

TABLE 10

Coefficients And Constants Of Flexibly Curved Surface

| Coefficients, And The Like | Surface Number 29 |
|---|---|
| C | 0 |
| k: Conic Constant | 0 |
| $c_2$: y | 0 |
| $c_3$: $x^2$ | −0.010400854 |
| $c_4$: $y^2$ | −0.010799926 |
| $c_5$: $x^2y$ | 2.21508E−05 |
| $c_6$: $y^3$ | −1.63187E−05 |
| $c_7$: $x^4$ | 7.31392E−07 |
| $c_8$: $x^2y^2$ | 1.6529E−06 |
| $c_9$: $y^4$ | −7.13048E−07 |
| $c_{10}$: $x^4y$ | 6.39024E−10 |
| $c_{11}$: $x^2y^3$ | 2.57584E−08 |
| $c_{12}$: $y^5$ | −2.353E−08 |
| $c_{13}$: $x^6$ | −1.65847E−10 |
| $c_{14}$: $x^4y^2$ | −4.06368E−10 |
| $c_{15}$: $x^2y^4$ | 4.34666E−10 |
| $c_{16}$: $y^6$ | −2.57497E−10 |
| $c_{17}$: $x^6y$ | −1.0773E−10 |
| $c_{18}$: $x^4y^3$ | −5.64734E−12 |
| $c_{19}$: $x^2y^5$ | 7.8582E−12 |
| $c_{20}$: $y^7$ | 3.39251E−13 |
| $c_{21}$: $x^8$ | 2.10987E−14 |
| $c_{22}$: $x^6y^2$ | 3.47961E−14 |
| $c_{23}$: $x^4y^4$ | −7.74361E−14 |
| $c_{24}$: $x^2y^6$ | 2.25221E−14 |
| $c_{25}$: $y^8$ | 1.73926E−14 |
| $c_{26}$: $x^8y$ | 1.46092E−16 |
| $c_{27}$: $x^6y^3$ | 1.96004E−16 |
| $c_{28}$: $x^4y^5$ | −1.46187E−15 |
| $c_{29}$: $x^2y^7$ | −8.26116E−16 |
| $c_{30}$: $y^9$ | 1.05346E−17 |
| $c_{31}$: $x^{10}$ | −1.18951E−18 |
| $c_{32}$: $x^8y^2$ | −1.16562E−18 |
| $c_{33}$: $x^6y^4$ | −2.92062E−18 |
| $c_{34}$: $x^4y^6$ | −1.09612E−17 |
| $c_{35}$: $x^2y^8$ | −6.60739E−18 |
| $c_{36}$: $y^{10}$ | −6.143741E−19 |

FIG. 4 illustrates part of FIG. 1, principally the lens optical system LS and the reflective optical system MR, in an enlarged manner in details, and it illustrates the state of pixel light fluxes that are separated within the lens optical system LS. On the cross-sectional surface of FIG. 4, after pixel light fluxes are emitted from the display screen of the light valve LV on the upper end, the center, and the lower end thereof in the vertical direction illustrated (more specifically, they correspond to the upper end, the middle of the upper section, and the middle of the light valve LV as the use area is skewed to the upper section of the light valve LV), the light fluxes are incident to the lens optical system LS, are temporarily overlapped with one another near the aperture diaphragm AD, are completely separated from one another at the lens that is located closest to the concave mirror CM, are temporarily collected so as to form an intermediate image, and are then reflected by the concave mirror CM.

There are two advantages of completely separating the pixel light fluxes as described above. Specifically, one is that the image quality is improved, and the other is that the light use efficiency of each of the pixel light fluxes within the lens optical system is easily controlled.

First, an explanation is given of the former, i.e., an improvement in the image quality. As it is clear from FIG. 1, the distance from the concave mirror CM to the lower end of the screen SC is significantly different from that from the concave mirror CM to the upper end of the screen SC (this can be said as the characteristics of up-close projectors). Therefore, it is necessary to apply an entirely different focusing effect in the lens optical system LS to a pixel light flux moving toward the lower end of the screen SC and to a pixel light flux moving toward the upper end of the screen SC.

Such an effect can be fully generated by the concave mirror CM; however, in such a case, a desired image quality cannot be expected. Therefore, pixel light fluxes are completely separated within the lens optical system LS, particularly, they are completely separated at the area where they pass through an aspheric surface lens, and a different effect is applied to each of the pixel light fluxes, whereby a desired image quality can be obtained.

Next, an explanation is given of the latter, i.e., a control on the light use efficiency. There is a difference in the distance over which each pixel light flux passes through a lens or in the angle at which it is incident to a lens surface; therefore, some difference occurs in the light use efficiency among pixel light fluxes. The difference in the light use efficiency is controlled by using a lens design as described below. In the above-described first example, the light use efficiency of a pixel light flux from the lower end of the display screen of the light valve LV is set to be higher within the lens optical system LS, and the light use efficiency of a pixel light flux from the upper end of the display screen of the light valve LV is set to be lower.

In the second example, for a more effective control, as described in the field of the effective radius (aperture radius) Ar of the optical surface in Table 6, the light shielding member SP1 is provided on the light valve LV's side of the first lens E1 to shield part of a pixel light flux from a pixel on the upper end of the display screen of the light valve LV, i.e., a light beam in the upper section of the light flux, and the light shielding member SP2 is further provided on the projected surface's side of the ninth lens E9 to shield part of the pixel light flux, i.e., a light beam in the lower section of the light flux (see FIG. 4). Therefore, on the cross-sectional surface of FIG. 4, the light use efficiency of a pixel light flux from the lower end of the display screen of the light valve LV can be set to be higher within the lens optical system LS, and the light use efficiency of a pixel light flux from the upper end of the display screen of the light valve LV can be set to be lower. Thus, as the applied effect is opposite to a difference in the light use efficiency at the dust preventing member DP as described above, even light use efficiency can be obtained in the range from the lower end of the screen SC to the upper end thereof. Hence, not only the light use efficiency at the dust preventing member is made even, but also the light use efficiency at the lens optical system is offset; thus, the light use efficiency can be even and the image quality can be even.

The width of the overall light flux is used as a measure of separated pixel light fluxes and, according to the second example in the same manner as the first example, as described in Table 9, the overall light flux width on the lens surface that is located closest to the concave mirror CM is 1.9 times the overall light flux width at the aperture diaphragm AD on the cross-sectional surface of FIG. 4, and it can be understood from FIG. 4 that the light fluxes are appropriately separated.

Furthermore, as it is clear from FIGS. 2 and 3, the shape of the dust preventing member DP is a cylindrical shape with a radius of curvature of 200 mm; therefore, the incident angle of a light beam moving in the horizontal direction of the screen SC is decreased, whereby the light use efficiency is improved.

Third Embodiment

Next, a detailed explanation is given of a projective optical system according to a specific third example that is a third embodiment of the above-described present invention.

Third Example

The third example is an example of the specific configuration of the projective optical system according to the third embodiment of the present invention.

Figure 5:
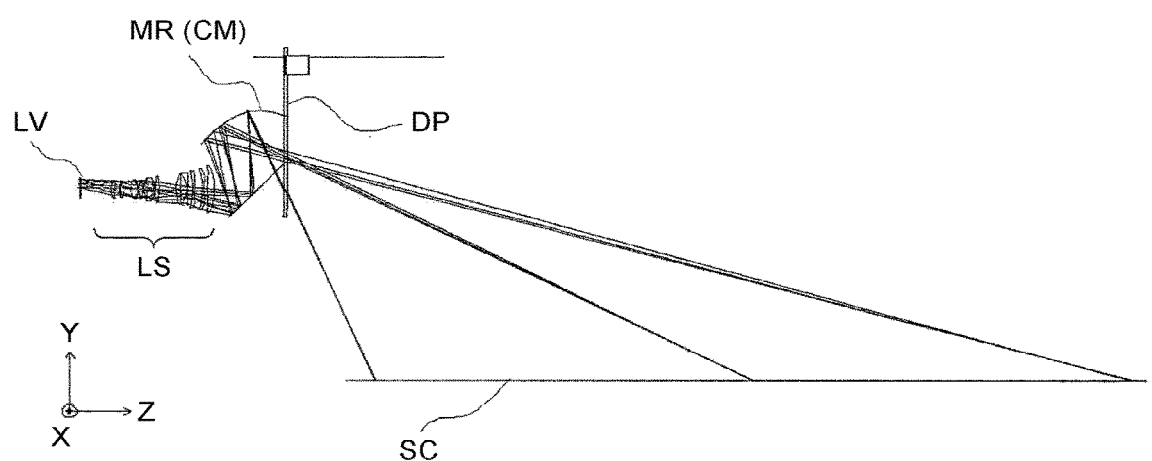
FIG. 5 is a cross-sectional view that illustrates the principal configuration of the overall projective optical system according to a third example that is a third embodiment of the present invention along the cross-sectional surface that includes the optical axis and that is perpendicular to the long side of the display screen of the image display element.
Figure 6:
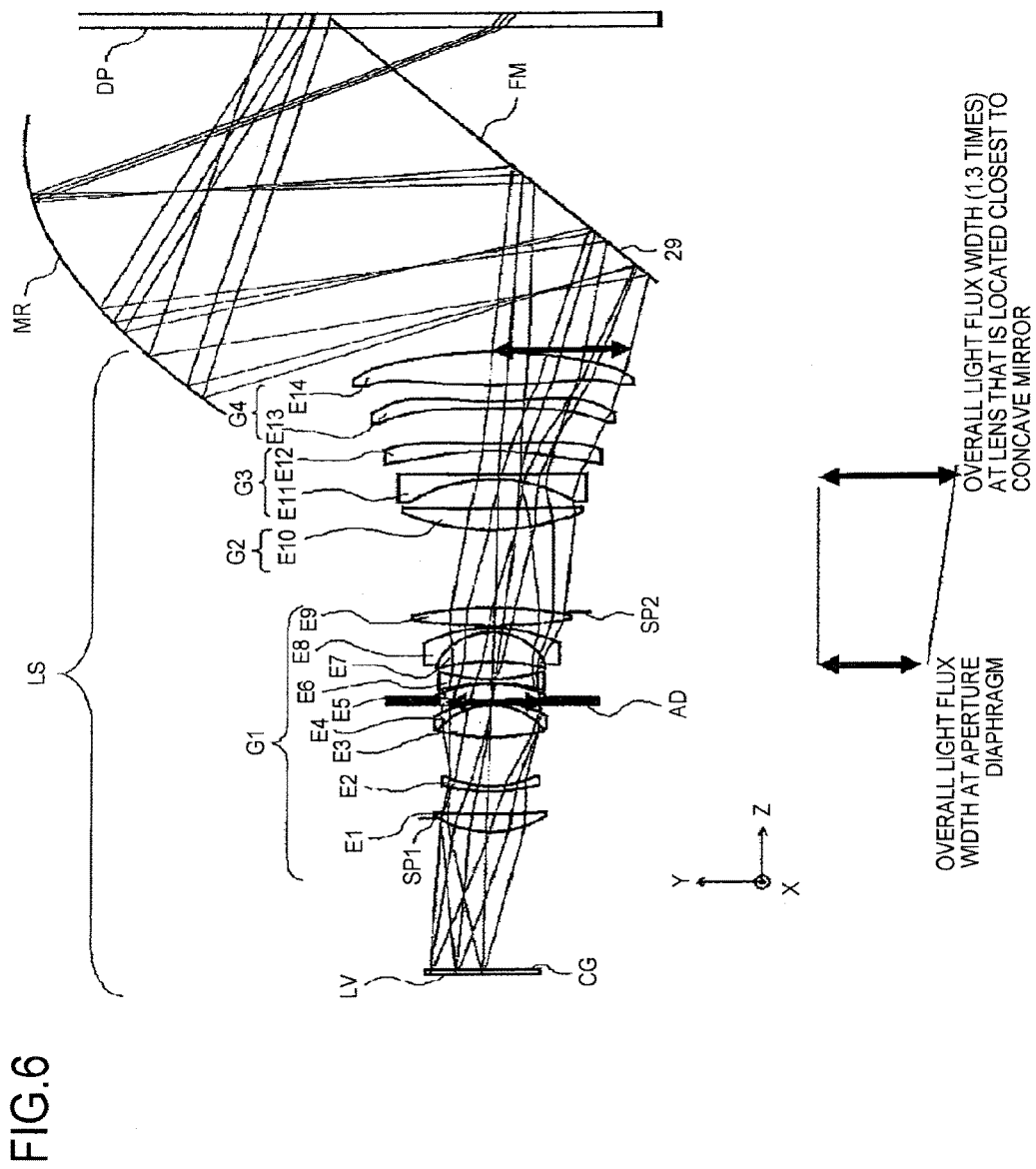
FIG. 6 is a cross-sectional view that illustrates part of the projective optical system of FIG. 5, principally the lens optical system and the reflective optical system, according to the third example in an enlarged manner and in more details.
Figure 7:
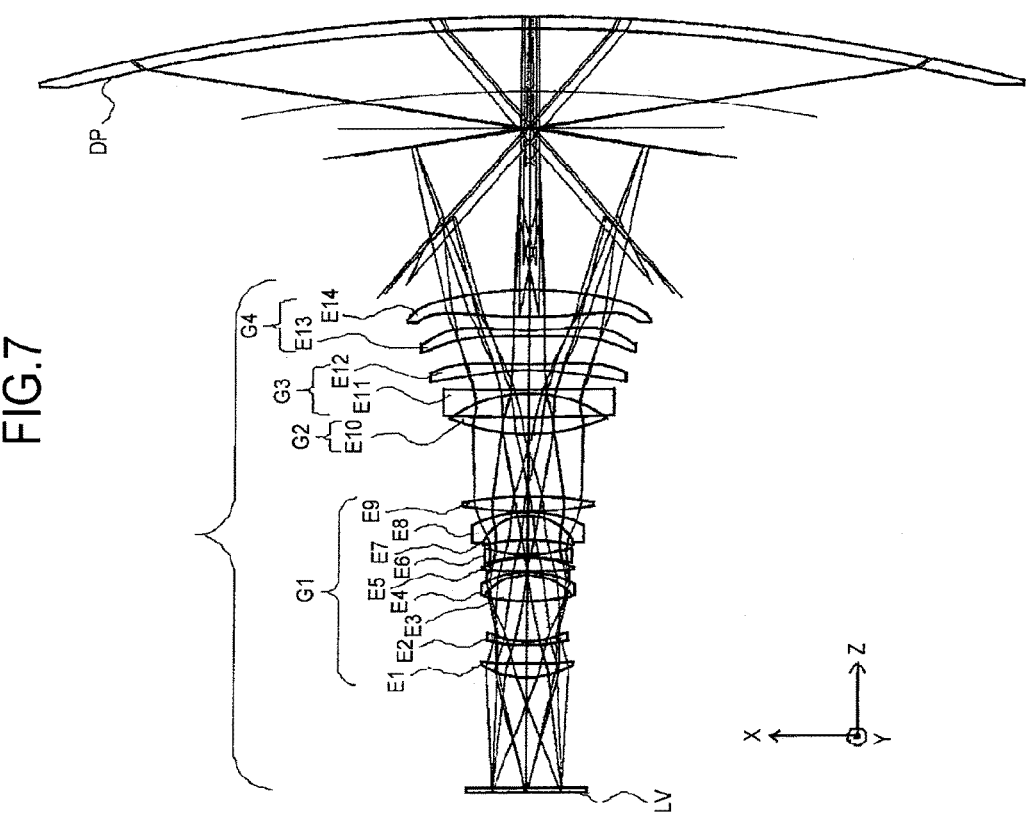
FIG. 7 is a cross-sectional view that illustrates the state of the projective optical system of FIG. 6 according to the third example when the cross-sectional surface that includes the optical axis of the lens optical system and that is perpendicular to the short side of the display screen of the image display element is viewed from the lower side of FIG. 6 to the upper side thereof.

FIGS. 5 to 7 illustrate the configuration of the projective optical system according to the third example that is the third embodiment of the present invention, FIG. 5 is a cross-sectional view that illustrates the principal configuration of the overall projective optical system according to the third example along the cross-sectional surface that includes the optical axis and that is perpendicular to the long side of the display screen of the image display element, FIG. 6 is a cross-sectional view that illustrates part of the projective optical system of FIG. 5, principally the lens optical system, in more details, and FIG. 7 is a cross-sectional view that illustrates the state of the projective optical system of FIG. 6 when the cross-sectional surface that includes the optical axis of the lens optical system and that is perpendicular to the short side of the display screen of the image display element is viewed from the lower side of FIG. 6 to the upper side thereof.

In FIGS. 5 and 6, the projective optical system enlarges and projects the image that is formed on the display screen of the light valve LV, which uses a DMD as an image display element, so as to form an image on the screen SC that forms a projected surface. The projective optical system includes the lens optical system LS, the reflective optical system MR, and the dust preventing member DP, which are sequentially arranged. Specifically, the image displayed on the light valve LV, such as a DMD, is enlarged and projected onto the projected surface of the screen SC by the projective optical system that includes the lens optical system LS, the reflective optical system MR, and the dust preventing member DP.

The lens optical system LS includes the first lens group G1, the second lens group G2, the third lens group G3, the fourth lens group G4, and the aperture diaphragm AD. The reflective optical system MR includes the concave mirror CM that has a flexibly curved surface and a return mirror FM that consists of a flat mirror FM, and the dust preventing member DP consists of a transmissive optical element that has an anamorphic surface and that has a partially cylindrical shape.

The dust preventing member DP is a transmissive optical element that includes, for example, plate-like optical glass, it is in a straight line as illustrated in FIGS. 5 and 6 on the cross-sectional surface that includes the optical axis of the lens optical system LS and that is perpendicular to the long side of the display screen of the light valve LV that is the image display element, and it is formed into a partially cylindrical shape and has a circular shape with a radius of curvature of 300 mm according to this example in FIG. 7 that is obtained when the cross-sectional surface that includes the optical axis of the lens optical system LS and that is perpendicular to the short side of the display screen of the image display element is viewed from the lower side of FIG. 6 to the upper side thereof. The dust preventing member DP has a layout such that the screen SC is perpendicular to a straight line that is parallel to the axis line of the cylindrical shape, i.e., a straight line along the straight cross-sectional shape on the cross-sectional surface that includes the optical axis and that is perpendicular to the long side of the display screen of the light valve LV as illustrated in FIG. 5.

Therefore, as illustrated in FIG. 5, the angle of a light beam moving toward the lower end of the screen SC relative to a perpendicular (normal) of the surface of the dust preventing member DP, i.e., the incident angle relative to the dust preventing member DP is larger, while the incident angle of a light beam moving toward the upper end of the screen SC relative to the dust preventing member DP is smaller. Therefore, there is a large difference in the transmittance, i.e., the light use efficiency, at the dust preventing member DP between a light beam moving toward the lower end of the screen SC and a light beam moving toward the upper end thereof (in this case, too, the light use efficiency of a light beam moving toward the lower end of the screen is lower, and the light use efficiency of a light beam moving toward the upper end of the screen is higher).

Here, a detailed explanation is given of an optical system that leads from the display screen of the light valve LV that uses the DMD as the image display element to the screen SC that forms the projected surface.

In the projective optical system illustrated in FIGS. 5 and 6, the flat-plate cover glass CG is provided on the display screen of the light valve LV to protect the display screen.

As described above, the lens optical system LS, which enlarges an image on the display screen of the light valve LV so as to form an image, includes the first lens group G1, the second lens group G2, the third lens group G3, and the fourth lens group G4 that are sequentially arranged from the side of the light valve LV, and the aperture diaphragm AD is provided within the first lens group G1.

The first lens group G1 includes the first lens E1, the second lens E2, the third lens E3, the fourth lens E4, the fifth lens E5, the sixth lens E6, the seventh lens E7, the eighth lens E8, the ninth lens E9, and the aperture diaphragm AD, and the first lens E1, the second lens E2, the third lens E3, the fourth lens E4, the aperture diaphragm AD, the fifth lens E5, the sixth lens E6, the seventh lens E7, the eighth lens E8, and the ninth lens E9 are sequentially arranged from the side of the light valve LV.

The first lens E1 is a positive lens that consists of a biconvex lens that has a convex surface that faces toward the light valve LV and that has a larger curvature (i.e., a smaller radius of curvature) compared to the one on the side of the projected surface, and it has aspheric surfaces formed both on the side of the projected surface and on the side of the light valve LV. The light shielding member SP1 that has an aperture radius of 8.16 mm is provided on the light valve LV's side of the first lens E1. The second lens E2 is a negative meniscus lens that has a concave surface facing toward the projected surface and has a convex formed on the side of the light valve LV.

The third lens E3 is a positive lens that consists of a biconvex lens that has a convex surface that faces toward the projected surface and that has a larger curvature compared to the one on the side of the light valve LV, and the fourth lens E4 is a negative meniscus lens that has a concave surface facing toward the light valve LV and has a convex formed on the side of the projected surface. The two lenses, i.e., the third lens E3 and the fourth lens E4, are tightly bonded to each other so as to be integrally joined, whereby a cemented lens is formed by joining the two pieces. Furthermore, the aperture diaphragm AD with an aperture radius of 8.28 mm is provided on the projected surface's side of the fourth lens E4.

The fifth lens E5 is a positive lens that consists of a biconvex lens that has a convex surface that faces toward the projected surface and that has a larger curvature compared to the one on the side of the light valve LV. The sixth lens E6 is a negative lens that includes a biconcave lens that has a concave surface that faces toward the projected surface and that has a slightly larger curvature compared to the one on the side of the light valve LV.

The seventh lens E7 is a positive meniscus lens that has a concave surface facing toward the light valve LV and has a convex formed on the side of the projected surface, and the eighth lens E8 is a negative meniscus lens that has a concave surface facing toward the light valve LV and has a convex formed on the side of the projected surface. The two lenses, i.e., the seventh lens E7 and the eighth lens E8, are tightly bonded to each other so as to be integrally joined, whereby a cemented lens is formed by joining the two pieces.

The ninth lens E9 is a positive lens that consists of a biconvex lens that has a convex surface that faces toward the projected surface and that has a slightly larger curvature compared to the one on the side of the light valve LV. The light shielding member SP2 that has an aperture radius of 11.95 mm is provided on the projected surface's side of the ninth lens E9.

The second lens group G2 consists of the tenth lens E10, and the tenth lens E10 is a positive meniscus lens that has a concave surface facing toward the projected surface and that has a convex formed on the side of the light valve LV.

The third lens group G3 includes the eleventh lens E11 and the twelfth lens E12, and the eleventh lens E11 and the twelfth lens E12 are sequentially arranged from the side of the light valve LV.

The eleventh lens E11 is a negative lens that consists of a biconcave lens that has a concave surface that faces toward the light valve LV and that has a larger curvature compared to the one on the side of the projected surface. The twelfth lens E12 is a negative lens that consists of a biconcave lens that has a concave surface that faces toward the light valve LV and that has a larger curvature compared to the one on the side of the projected surface, and it has aspheric surfaces formed both on the side of the projected surface and on the side of the light valve LV.

The fourth lens group G4 includes the thirteenth lens E13 and the fourteenth lens E14, and the thirteenth lens E13 and the fourteenth lens E14 are sequentially arranged from the side of the light valve LV.

The thirteenth lens E13 is a negative meniscus lens that has a concave surface facing toward the projected surface and that has a convex formed on the side of the light valve LV, and it has aspheric surfaces formed both on the side of the projected surface and on the side of the light valve LV. The fourteenth lens E14 is a positive lens that consists of a biconvex lens that has a convex surface that faces toward the projected surface and that has a larger curvature compared to the one on the side of the light valve LV, and it has aspheric surfaces formed both on the side of the projected surface and on the side of the light valve LV.

In this case, the reflective optical system MR includes the return mirror FM that has a flat reflective surface formed to reflect and return the light from the lens optical system LS and includes the concave mirror CM that has a reflective surface that is a flexibly curved surface formed to reflect the light that is emitted from the return mirror FM.

As described above, the dust preventing member DP is in a straight line on the cross-sectional surface that includes the optical axis of the lens optical system LS and that is perpendicular to the long side of the display screen of the light valve LV, and, in this case, it includes a transmissive optical element that forms what is called an anamorphic surface that has a circular shape with a radius of curvature of 300 mm and has a partially cylindrical shape with a thickness of 3 mm when the cross-sectional surface that includes the optical axis of the lens optical system LS and that is perpendicular to the short side of the display screen of the light valve LV is viewed from the lower side of FIG. 6 to the upper side thereof. In this case, the dust preventing member DP has a thickness of 3 mm, the two surfaces thereof are curved in a circular shape with a radius of curvature of 300 mm, and it does not have a refractive power.

The reference marks that are described above and are used in FIGS. 5 and 6 are commonly used for the corresponding components in the first example and the second example in order to prevent explanations from being complicated due to an increase in the digit numbers of the reference marks; therefore, although the same reference marks as those in FIGS. 1, 2 and, 4 are attached, they do not always indicate the same configurations in the corresponding first and second examples.

The optical characteristics of each optical element according to the third example are described in the following Table 11.

TABLE 11

| | | | Optical Characteristics | | | | | | |
|---|---|---|---|---|---|---|---|---|---|
| Surface Number | R | d | nd | ν | Ar | EcY | Ecα | | Remarks |
| LB (0) | 1.0E+18 | 1.000 | | | | 0 | 0 | | LV |
| 1 | 1.0E+18 | 1.000 | 1.5168 | 64.2 | | 0 | 0 | | CG |
| 2 | 1.0E+18 | 28.000 | | | | 0 | | | |
| 3* | 14.226 | 3.622 | 1.48749 | 70.4 | 8.16 | −1.320 | 0 | E1 | G1 |
| 4* | −2774.396 | 4.564 | | | | −1.320 | 0 | | |
| 5 | 2.6E+01 | 1.000 | 1.8595 | 25.2 | | −1.320 | 0 | E2 | |

TABLE 11-continued

Optical Characteristics

| Surface Number | R | d | nd | ν | Ar | EcY | Ecα | Remarks | |
|---|---|---|---|---|---|---|---|---|---|
| 6 | 14.718 | 10.000 | | | | −1.320 | 0 | | |
| 7 | 28.724 | 6.519 | 1.5658 | 44.8 | | −1.320 | 0 | E3 | |
| 8 | −10.007 | 0.800 | 1.9037 | 31.3 | | −1.320 | 0 | E4 | |
| Aperture Diaphragm | −15.375 | 0.300 | | | 8.28 | −1.320 | 0 | AD | |
| 10 | 94.678 | 3.352 | 1.5493 | 69.0 | | −1.320 | 0 | E5 | |
| 11 | −18.050 | 0.100 | | | | −1.320 | 0 | | |
| 12 | −26.196 | 0.800 | 1.8185 | 45.9 | | −1.320 | 0 | E6 | |
| 13 | 24.468 | 3.541 | | | | −1.320 | 0 | | |
| 14 | −29.919 | 5.956 | 1.5876 | 39.4 | | −1.320 | 0 | E7 | |
| 15 | −9.250 | 0.900 | 1.8777 | 34.4 | | −1.320 | 0 | E8 | |
| 16 | 21.305 | 0.300 | | | | −1.320 | 0 | | |
| 17 | 60.278 | 3.726 | 1.6689 | 31.2 | 11.95 | −1.320 | 0 | E9 | |
| 18 | −56.945 | (15.918) | | | | −1.320 | 0 | | |
| 19 | 32.648 | 4.308 | 1.6330 | 34.1 | | −1.320 | 0 | E10 | G2 |
| 20 | 408.689 | (5.732) | | | | −1.320 | 0 | | |
| 21 | −22.721 | 1.000 | 1.8555 | 37.8 | | −1.320 | 0 | E11 | G3 |
| 22 | 1196.389 | 4.837 | | | | −1.320 | 0 | | |
| 23* | −3.97E+01 | 1.500 | 1.5305 | 55.8 | | −1.320 | 0 | E12 | |
| 24* | 72.654 | (2.977) | | | | −1.320 | 0 | | |
| 25* | 445.777 | 1.500 | 1.5305 | 55.8 | | −1.320 | 0 | E13 | G4 |
| 26* | 48.654 | 3.288 | | | | −1.320 | 0 | | |
| 27* | 83.622 | 6.743 | 1.5305 | 55.8 | | −1.320 | 0 | E14 | |
| 28* | −56.704 | (44.959) | | | | −1.320 | 0 | | |
| Return Mirror 29 | 1.0E+18 | 0.000 | | | | −1.320 | −45 | FM | MR |
| Concave Mirror 30 | 1.0E+18 | 16.000 | | | | 74.390 | −10.2 | CM | |
| Dust Preventing Member 31 | −300 (Cylindrical Surface) | Thickness 3 mm | 1.5168 | 64.2 | | (−378.200) | −90 | DP | |
| Dust Preventing Member 32 | −300 (Cylindrical Surface) | | | | | | −90 | | |
| Screen 33 | | | | | | | −90 | SC | |

The lens surface that is denoted by the surface number with "*" attached thereto in Table 11 is an aspheric surface.

Specifically, in Table 11, the optical surfaces with "*" attached thereto, i.e., the 3rd surface, the 4th surface, the 23rd surface, the 24th surface, the 25th surface, the 26th surface, the 27th surface, and the 28th surface are aspheric surfaces, and the parameters of each of the aspheric surfaces in Equation (1) are described in the following Table 12.

TABLE 12

Aspheric Surface Parameter

| Surface Number | 3 | 4 | 23 | 24 |
|---|---|---|---|---|
| K | 0.363915475 | | 1.521184568 | −99 |
| $A_4$ | −4.451854E−05 | 5.694998E−05 | 2.632937E−05 | −3.161317E−05 |
| $A_6$ | 1.985547E−07 | 3.174261E−07 | −1.629057E−08 | 4.431272E−08 |
| $A_8$ | −3.770254E−09 | −1.546262E−09 | −2.049865E−11 | −8.122322E−11 |
| $A_{10}$ | 3.998137E−11 | 3.870056E−11 | 6.865732E−14 | 4.470026E−14 |
| $A_{12}$ | | | | |

| Surface Number | 25 | 26 | 27 | 28 |
|---|---|---|---|---|
| K | | −3.682497222 | −97.11494101 | 3.569806264 |
| $A_4$ | −3.929605E−05 | −3.898601E−05 | 1.333119E−05 | 1.102680E−06 |
| $A_6$ | 4.838577E−08 | −9.530348E−09 | −6.977050E−08 | 3.401804E−08 |

TABLE 12-continued

Aspheric Surface Parameter

| | | | | |
|---|---|---|---|---|
| $A_8$ | −4.694054E−11 | 5.326059E−11 | 9.319587E−11 | −6.242396E−11 |
| $A_{10}$ | −6.720295E−15 | −2.374923E−13 | −1.117966E−13 | 2.430555E−15 |
| $A_{12}$ | 1.319521E−16 | 3.884639E−16 | | |

Furthermore, the surface interval d between the 18th surface and the 19th surface, between the 20th surface and the 21st surface, between the 24th surface and the 25th surface, between the 28th surface and the 29th surface, and between the 32nd surface and the 33rd surface in Table 11 indicates the group interval between the first lens group G1 and the second lens group G2, between the second lens group G2 and the third lens group G3, between the third lens group G3 and the fourth lens group G4, between the fourth lens group G4 and the return mirror FM, and between the dust preventing member DP and the screen SC and, in the illustrated case, the screen size is, for example, 80 inches. The magnifying power can be changed by changing the surface intervals, i.e., the group interval between the first lens group G1 and the second lens group G2, between the second lens group G2 and the third lens group G3, between the third lens group G3 and the fourth lens group G4, between the fourth lens group G4 and the return mirror FM, and between the dust preventing member DP and the screen SC, and the values in the following Table 13 are obtained in the case where the screen size is 80 inches and in the case where it is 48 inches.

TABLE 13

| Surface Number | Group Interval | |
|---|---|---|
| | 80 Inches | 48 Inches |
| 18-19 | 15.918 | 15.843 |
| 20-21 | 5.732 | 5.850 |
| 24-25 | 2.977 | 7.093 |
| 28-29 | 44.959 | 40.801 |
| 32-33 | 378.200 | 240.900 |

The overall light flux width at the 9th surface that is the aperture diaphragm AD and the overall light flux width at the 28th surface are obtained as described in the following Table 14 if the screen size is 80 inches.

TABLE 14

Overall Light Flux Width Ratio

| | Overall Light Flux Width (80 Inches) |
|---|---|
| Aperture Diaphragm AD 9th Surface | 16.56 mm |
| 28th Surface | 21.75 mm |
| Ratio | 1.3 Times |

The 30th surface of the concave mirror CM that is indicated in Table 11 indicates a flexibly curved surface, the shape of the flexibly curved surface is defined by Equation (2), and the coefficients and the constants, such as $C_1$, are given by the following Table 15.

TABLE 15

Coefficients And Constants Of Flexibly Curved Surface

| Coefficients, And The Like | Surface Number 30 |
|---|---|
| c | 0 |
| k: Conic Constant | 0 |
| $c_2$: y | 0 |
| $c_3$: $x^2$ | 0.013190634 |
| $c_4$: $y^2$ | 0.0082059 |
| $c_5$: $x^2y$ | −2.27103E−05 |
| $c_6$: $y^3$ | −0.000200212 |
| $c_7$: $x^4$ | −1.63748E−06 |
| $c_8$: $x^2y^2$ | 1.63402E−06 |
| $c_9$: $y^4$ | −2.14745E−06 |
| $c_{10}$: $x^4y$ | −1.45342E−08 |
| $c_{11}$: $x^2y^3$ | 1.13433E−07 |
| $c_{12}$: $y^5$ | 1.97229E−08 |
| $c_{13}$: $x^6$ | 6.91006E−10 |
| $c_{14}$: $x^4y^2$ | −8.38492E−11 |
| $c_{15}$: $x^2y^4$ | 1.36616E−09 |
| $c_{16}$: $y^6$ | 5.23456E−10 |
| $c_{17}$: $x^6y$ | 8.37755E−12 |
| $c_{18}$: $x^4y^3$ | −2.17924E−11 |
| $c_{19}$: $x^2y^5$ | −1.48391E−11 |
| $c_{20}$: $y^7$ | −5.40742E−13 |
| $c_{21}$: $x^8$ | −1.61534E−13 |
| $c_{22}$: $x^6y^2$ | −3.29893E−14 |
| $c_{23}$: $x^4y^4$ | −2.24124E−13 |
| $c_{24}$: $x^2y^6$ | −2.16064E−13 |
| $c_{25}$: $y^8$ | −4.06095E−14 |
| $c_{26}$: $x^8y$ | −1.63831E−15 |
| $c_{27}$: $x^6y^3$ | 1.50613E−15 |
| $c_{28}$: $x^4y^5$ | 3.92598E−15 |
| $c_{29}$: $x^2y^7$ | 2.03489E−15 |
| $c_{30}$: $y^9$ | 1.05145E−16 |
| $c_{31}$: $x^{10}$ | 1.61931E−17 |
| $c_{32}$: $x^8y^2$ | 8.671E−18 |
| $c_{33}$: $x^6y^4$ | 3.75562E−17 |
| $c_{34}$: $x^4y^6$ | 6.20312E−17 |
| $c_{35}$: $x^2y^8$ | 3.36287E−17 |
| $c_{36}$: $y^{10}$ | 4.081983E−18 |

FIG. 6 illustrates part of FIG. 5, principally the lens optical system LS, in an enlarged manner in details, and it illustrates the state of pixel light fluxes that are separated within the lens optical system LS. On the cross-sectional surface of FIG. 6, after pixel light fluxes are emitted from the display screen of the light valve LV on the upper end, the center, and the lower end thereof in the vertical direction illustrated, the light fluxes enter the lens optical system LS, are temporarily overlapped with one another near the aperture diaphragm AD, are completely separated from one another at the lens that is located closest to the return mirror FM, are reflected by the return mirror FM, are temporarily collected so as to form an intermediate image, and are then reflected by the concave mirror CM.

In the third example, the effect of the reflectance of the flat return mirror FM is further added to the effect of offsetting the light use efficiency by using the dust preventing member DP and the lens optical system LS according to the second example.

The overall optical system is illustrated in FIG. 5 and, in this case, the dust preventing member DP is also in a straight line on the cross-sectional surface that includes the optical axis of the lens optical system LS and that is perpendicular to the long side of the display screen of the light valve LV and, on the cross-sectional surface that is at a right angle to the above and is illustrated in FIG. 7, it has a cylindrical shape with a radius of curvature of 300 mm. Furthermore, in this case, the screen SC is also perpendicular to the axis line of the cylindrical shape of the dust preventing member DP that has a curvature.

Here, an explanation is given of the advantage of using the return mirror FM. According to the third example, to reduce the size of the optical system, a change in the overall light flux width (the degree of separation of pixel light fluxes) is reduced to 1.3 times as illustrated in Table 14. If the degree of separation is reduced to a value less than 1.3 times, it is not possible to obtain a completely desired image quality, and it is difficult to shield a light beam of each pixel light flux.

According to the third example, as described in Table 11, part of the pixel light flux from the upper end of the display screen of the light valve LV on the cross-sectional surface of FIG. 6 is shielded on the light valve LV's side of the first lens E1 and on the projected surface's side of the ninth lens E9; however, compared to the second example, the pixel light fluxes are not separated enough, and part of a pixel light flux from the display screen is shielded. Therefore, it is difficult to achieve a desired balance so as to offset a difference in the light use efficiency at the dust preventing member DP. There are possible methods to solve this problem, i.e., moving the concave mirror CM and the screen SC further apart from each other so as to reduce the difference between the angle of a light beam that enters the dust preventing member DP from the upper end of the display screen of the light valve LV and the angle of a light beam that enters the dust preventing member DP from the lower end of the display screen, or tilting the dust preventing member DP at an appropriate angle instead of placing it in a vertical direction. Although the method of tilting the dust preventing member DP causes an increase in the size of the dust preventing member DP, the method is applicable; however, if the distance between the concave mirror CM and the screen SC is increased, the value of up-close projectors, i.e., optical systems that have a combination of the concave mirror CM and a lens system, is decreased undesirably. The return mirror offers an advantage for the above fine adjustment. Particularly, as this surface is a fixed surface that does not move during focusing, the incident angle of each pixel light flux relative to the flat surface is substantially the same, and the coating characteristics of the flat surface is controlled so that the reflectance of a pixel light flux from the upper end of the display screen of the light valve LV in FIG. 6, for example, can be increased or decreased (conversely, the reflectance of a pixel light flux from the lower end can be decreased or increased).

As described above, the light use efficiency can be finely adjusted by making use of the fact that the incident angle of a light beam that enters the return mirror FM is different depending on a pixel light flux and that it does not substantially change during focusing.

For example, the projective optical systems of the above-mentioned embodiments have the configuration including the lens optical system LS and the reflective optical system MR, however, in the present invention, the projective optical system can be a system that includes only the lens optical system LS without including the reflective optical system.

According to an aspect of the present invention, it is possible to provide a projective optical system that is capable of reducing variations in the lighting intensity of each location of an image on a projected surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projective optical system that enlarges and projects, on a projected surface, an image that is displayed on an image display element, the projective optical system comprising:
   a lens optical system that includes a plurality of lenses and an aperture diaphragm;
   a transmissive optical element that has curvature with respect to a direction that corresponds to a long side of a display screen of the image display element and that is provided in an optical path between the lens optical system and the projected surface; and
   a shielding unit that shields a part of a light flux that is incident to the lens optical system from a pixel on the display screen of the image display element, the pixel being located farthest from an optical axis of the lens optical system in a direction passing through a center of the image display element and corresponding to a direction perpendicular to the long side of the display screen of the image display element, at a position other than a position of the aperture diaphragm and makes a light intensity of a first light flux that is incident to the transmissive optical element at a first incident angle lower than a light intensity of a second light flux that is incident to the transmissive optical element at a second incident angle being larger than the first incident angle, on a cross-sectional surface that is perpendicular to the long side of the display screen of the image display element, and with respect to light that is emitted from the lens optical system and that is incident to the transmissive optical element,
   wherein a portion of the shielding unit is provided between two adjacent lenses of the lens optical system, and
   at least one straight line exists that passes through the two adjacent lenses and the portion of the shielding unit.

2. The projective optical system according to claim 1, further comprising a reflective optical system that has one or more reflective surfaces formed in an optical path between the lens optical system and the transmissive optical element.

3. The projective optical system according to claim 2, wherein the reflective surfaces of the reflective optical system include one or more curved reflective surfaces.

4. The projective optical system according to claim 3, wherein the reflective optical system includes a flat return reflective surface that is provided between the lens optical system and the curved reflective surface.

5. The projective optical system according to claim 3, wherein the curved reflective surface of the reflective optical system is a concave reflective surface that includes a flexibly curved mirror.

6. The projective optical system according to claim 5, wherein
   an intermediate image of the image display element is formed, and the whole intermediate image is formed between a return reflective surface and the concave reflective surface by the lens optical system.

7. The projective optical system according to claim 1, wherein the transmissive optical element is fixedly provided without any change in a position relative to the image display element due to a lens movement.

8. The projective optical system according to claim 1, wherein
the transmissive optical element includes a first surface to which light is incident and a second surface from which light is emitted, the first surface and the second surface being in an optical path that leads from the display screen of the image display element to the projected surface, and
surface shapes of the first surface and the second surface are identical shapes at least in an area where a light flux is transmitted so as to be involved in forming an image.

9. The projective optical system according to claim 1, wherein
the first light flux is a light flux that passes through a peripheral section of the lens optical system among light fluxes that are involved in forming an image, and
the second light flux is a light flux that passes near an optical axis of the lens optical system among light fluxes that are involved in forming an image.

10. The projective optical system according to claim 1, wherein the transmissive optical element is an optical element that is located closest to a side of the projected surface in an optical path from the image display element to the projected surface.

11. The projective optical system according to claim 1, wherein the transmissive optical element also functions as a dust preventing member that prevents dust from entering an optical system that includes the lens optical system.

12. The projective optical system according to claim 1, wherein
a width of an overall light flux that comes from the display screen of the image display element and that passes through a lens that is located closest to the reflective optical system in the lens optical system is more than 1.3 times a width of an overall light flux at a position of the aperture diaphragm on an arbitrary cross-sectional surface that includes an optical axis of the lens optical system.

13. The projective optical system according to claim 1, wherein,
on a cross-sectional surface that includes an optical axis of the lens optical system and that is perpendicular to the long side of the display screen of the image display element, there is a difference of more than 45 degrees between an incident angle of a light beam toward an uppermost end of a projective screen on the projected surface and an incident angle of a light beam toward a lowermost end of the projective screen.

14. The projective optical system according to claim 1, wherein
the lens optical system includes a plurality of lens groups and is configured to perform a focus adjustment by moving one or more lens groups among the lens groups, and
a lens group that is located closest to the image display element among the lens groups is a fixed lens group that has a positive refractive power and that does not move in accordance with a focus adjustment, and the aperture diaphragm that is fixed and does not move in accordance with a focus adjustment is provided either inside the fixed lens group or near the fixed lens group.

15. The projective optical system according to claim 1, wherein
the lens optical system includes at least three lens groups including
a first lens group that has a positive refractive power;
a second lens group that has a positive refractive power; and
a third lens group that has a negative refractive power, and
the first lens group, the second lens group, and the third lens group are sequentially arranged from a side of the image display element to a side of the projected surface.

16. The projective optical system according to claim 1, wherein
the lens optical system includes
a first lens group that is a fixed lens group that does not move in accordance with a focus adjustment and that has a positive refractive power;
a second lens group that has a positive refractive power; and
a third lens group that has a negative refractive power,
the first lens group, the second lens group, and the third lens group are sequentially arranged from a side of the image display element to a side of the projected surface, and
the shielding unit is provided between the first lens group and the second lens group.

17. The projective optical system according to claim 1, wherein the transmissive optical element is in a straight line on a cross-sectional surface that is perpendicular to the long side of the display screen of the image display element, and the straight line is perpendicular or parallel to the display screen of the image display element.

18. The projective optical system according to claim 1, wherein
on a cross-sectional surface that includes an optical axis of the lens optical system and that is perpendicular to the long side of the display screen of the image display element, a pixel light flux from a pixel on an upper end of the display screen of the image display element is separated from a pixel light flux from a pixel on an lower end of the display screen of the image display element without being overlapped with each other at a lens that is located closest to the reflective optical system in the lens optical system.

19. An image projection device comprising the projective optical system of claim 1.

* * * * *